(12) United States Patent
Chen et al.

(10) Patent No.: US 9,557,239 B2
(45) Date of Patent: Jan. 31, 2017

(54) DETERMINATION OF STRAIN COMPONENTS FOR DIFFERENT DEFORMATION MODES USING A FILTER

(75) Inventors: Jianfeng Chen, Pearland, TX (US); Xudong Yang, Katy, TX (US); Brian L. Thigpen, Houston, TX (US); Brooks A. Childers, Christianburg, VA (US)

(73) Assignee: BAKER HUGHES INCORPORATED, Houston, TX (US)

( * ) Notice: Subject to any disclaimer, the term of this patent is extended or adjusted under 35 U.S.C. 154(b) by 360 days.

(21) Appl. No.: 12/960,119

(22) Filed: Dec. 3, 2010

(65) Prior Publication Data

US 2012/0143524 A1 Jun. 7, 2012

(51) Int. Cl.
| G01L 1/00 | (2006.01) |
| G01L 5/00 | (2006.01) |
| G01L 25/00 | (2006.01) |
| G01L 1/24 | (2006.01) |
| E21B 47/00 | (2012.01) |
| G01D 5/353 | (2006.01) |
| G01B 11/16 | (2006.01) |
| E21B 47/12 | (2012.01) |

(52) U.S. Cl.
CPC .......... *G01L 25/00* (2013.01); *E21B 47/0006* (2013.01); *E21B 47/123* (2013.01); *G01B 11/165* (2013.01); *G01D 5/35316* (2013.01); *G01L 1/24* (2013.01); *G01L 1/246* (2013.01); *G01L 5/0047* (2013.01)

(58) Field of Classification Search
CPC .......... G01L 1/24; G01L 5/0047; G01L 1/246; G01N 2203/0023; G01N 2203/0075
USPC .......................................................... 702/42
See application file for complete search history.

(56) References Cited

U.S. PATENT DOCUMENTS

| 4,030,064 A | 6/1977 | Elliott |
| 4,859,844 A | 8/1989 | Herman et al. |
| 5,050,089 A | 9/1991 | Stelson et al. |
| 5,401,956 A | 3/1995 | Dunphy et al. |
| 5,440,310 A * | 8/1995 | Schreiner ...................... 342/124 |
| 5,481,922 A | 1/1996 | Washabaugh |
| 5,625,724 A | 4/1997 | Frederick et al. |
| 5,675,674 A | 10/1997 | Weis |
| 5,869,835 A | 2/1999 | Udd |
| 5,892,860 A | 4/1999 | Maron et al. |

(Continued)

FOREIGN PATENT DOCUMENTS

| DE | 19913113 A1 | 10/2000 |
| EP | 0892244 A2 | 1/1999 |

(Continued)

OTHER PUBLICATIONS

English Abstract of RU 2205374, May 2003.*

(Continued)

*Primary Examiner* — Michael Nghiem
(74) *Attorney, Agent, or Firm* — Cantor Colburn LLP

(57) ABSTRACT

A method, apparatus and computer-readable medium for determining a strain component for a deformation mode of a member is disclosed. A plurality of measurements is obtained, wherein each of the plurality of measurements relates to a strain at a location of the member. A deformation mode is selected and an adjustable filter is applied to the plurality of strain measurements to determine the strain component for the selected deformation mode.

17 Claims, 16 Drawing Sheets

(56) References Cited

U.S. PATENT DOCUMENTS

| | | | |
|---|---|---|---|
| 5,963,321 A | 10/1999 | Wang | |
| 6,016,702 A | 1/2000 | Maron | |
| 6,069,686 A | 5/2000 | Wang et al. | |
| 6,072,567 A | 6/2000 | Sapack | |
| 6,233,746 B1 | 5/2001 | Skinner | |
| 6,252,656 B1 | 6/2001 | Wu et al. | |
| 6,256,090 B1 | 7/2001 | Chen et al. | |
| 6,285,446 B1 | 9/2001 | Farhadiroushan | |
| 6,314,214 B1 | 11/2001 | Walter et al. | |
| 6,346,702 B1 | 2/2002 | Davis et al. | |
| 6,370,406 B1 | 4/2002 | Wach et al. | |
| 6,487,349 B2 | 11/2002 | Wach et al. | |
| 6,501,067 B2 | 12/2002 | Jones et al. | |
| 6,545,760 B1* | 4/2003 | Froggatt et al. | 356/477 |
| 6,611,633 B1 | 8/2003 | Vohra et al. | |
| 6,640,647 B1 | 11/2003 | Hong et al. | |
| 6,753,791 B2 | 6/2004 | Wei et al. | |
| 7,028,543 B2 | 4/2006 | Hardage et al. | |
| 7,245,791 B2 | 7/2007 | Rambow et al. | |
| 7,327,907 B2 | 2/2008 | Shaibani et al. | |
| 7,424,186 B2 | 9/2008 | Arab-Sadeghabadi et al. | |
| 7,769,252 B2 | 8/2010 | Taverner et al. | |
| 7,946,341 B2 | 5/2011 | Hartog et al. | |
| 2001/0021843 A1 | 9/2001 | Bosselmann et al. | |
| 2002/0075114 A1 | 6/2002 | Hall et al. | |
| 2003/0217605 A1 | 11/2003 | Croteau et al. | |
| 2003/0219147 A1 | 11/2003 | Nishiura | |
| 2004/0028311 A1 | 2/2004 | Moslehi et al. | |
| 2004/0065439 A1 | 4/2004 | Tubel et al. | |
| 2004/0083808 A1 | 5/2004 | Rambow et al. | |
| 2004/0099420 A1 | 5/2004 | Kotrla et al. | |
| 2004/0184700 A1 | 9/2004 | Li et al. | |
| 2005/0149264 A1 | 7/2005 | Tarvin et al. | |
| 2005/0167094 A1 | 8/2005 | Streich et al. | |
| 2006/0120675 A1 | 6/2006 | Goldner et al. | |
| 2006/0225881 A1 | 10/2006 | O'Shaughnessy et al. | |
| 2006/0233482 A1 | 10/2006 | Rambow | |
| 2007/0051882 A1 | 3/2007 | Childers | |
| 2007/0065077 A1 | 3/2007 | Childers et al. | |
| 2007/0126594 A1 | 6/2007 | Atkinson et al. | |
| 2007/0156019 A1 | 7/2007 | Larkin et al. | |
| 2007/0251326 A1 | 11/2007 | Mathis | |
| 2007/0253144 A1* | 11/2007 | Kuwajima | 361/311 |
| 2007/0289741 A1* | 12/2007 | Rambow | 166/250.01 |
| 2008/0047662 A1* | 2/2008 | Dria | E21B 47/0006 156/249 |
| 2008/0210725 A1 | 9/2008 | Birtwisle et al. | |
| 2009/0063087 A1 | 3/2009 | Grichnik et al. | |
| 2009/0085710 A1 | 4/2009 | Meinke | |
| 2009/0097015 A1 | 4/2009 | Davies et al. | |
| 2009/0254280 A1* | 10/2009 | Stoesz | 702/6 |
| 2010/0051347 A1* | 3/2010 | Tchakarov et al. | 175/50 |
| 2010/0219334 A1* | 9/2010 | Legrand et al. | 250/256 |
| 2010/0303426 A1 | 12/2010 | Davis | |
| 2011/0054808 A1* | 3/2011 | Pearce et al. | 702/42 |
| 2011/0113852 A1 | 5/2011 | Prisco | |
| 2012/0132417 A1 | 5/2012 | Dria et al. | |
| 2012/0143522 A1 | 6/2012 | Chen et al. | |
| 2012/0143523 A1 | 6/2012 | Chen et al. | |
| 2012/0143524 A1 | 6/2012 | Chen et al. | |
| 2012/0143525 A1* | 6/2012 | Chen et al. | 702/42 |

FOREIGN PATENT DOCUMENTS

| | | | |
|---|---|---|---|
| GB | 2368921 A | | 5/2002 |
| GB | 2397885 A | | 8/2004 |
| GB | 2411956 A | | 9/2005 |
| GB | 2433112 A | | 6/2007 |
| JP | 3252501 A | | 11/1991 |
| JP | 2002107122 A | | 4/2002 |
| JP | 2003294851 A | | 10/2003 |
| RU | 2205374 | * | 5/2003 |
| WO | WO0012978 | | 3/2000 |
| WO | WO03014657 A1 | | 2/2003 |
| WO | WO03050376 A2 | | 6/2003 |
| WO | WO2006113327 A1 | | 10/2006 |
| WO | WO2006123068 A1 | | 11/2006 |
| WO | 2008021881 A2 | | 2/2008 |
| WO | 2009068907 A1 | | 6/2009 |

OTHER PUBLICATIONS

International Search Report and Written Opinion dated Jun. 28, 2012 for International Application No. PCT/US2011/059130.

International Search Report and Written Opinion dated Jun. 29, 2012 for International Application No. PCT/US2011/059119.

International Search Report and Written Opinion dated Jun. 29, 2012 for International Application No. PCT/US2011/059124.

International Search Report and Written Opinion dated Jun. 28, 2012 for International Application No. PCT/US2011/059122.

International Search Report and the Written Opinion of the International Searching Authority, or the Declaration for International Application No. PCT/US2011/059116.

Barak, Phillip; "Smoothing and Differentiation by an Adaptive-Degree Polynomial Filter," Analytical Chemistry, vol. 67, No. 17, Sep. 1, 1995, pp. 2758-2762.

Browne, M., et al.; "A multiscale polynomial filter for adaptive smoothing," Digital Signal Processing 17, (2007), pp. 69-75.

Hayes, Monson H.; "Recursive Least Squares, 9.4," Statistical Digital Signal Processing and Modeling, 1996, pp. 541-553.

Savitzky, A. et al.; "Smoothing and Differentiation of Data by Simplified Least Squares Procedures," Analytical Chemistry, vol. 36, No. 8, Jul. 1964, pp. 1627-1639.

Rambow, F.H.K. et al.; "Real-Time Fiber-Optic Casing Imager," Dec. 2010 SPE Journal, pp. 1095-1103.

Timoshenko, S.; "Analysis of Bi-Metal Thermostats," J.O.S.A. & R.S.I., Sep. 11, 1925, pp. 233-255.

The extended European search report; Application No. 11845939; dated Nov. 2, 2015; pp. 1-7.

The extended Eurpoean search report; Application No. 11845563; Date of Mailing: Aug. 20, 2015; pp. 1-7.

* cited by examiner

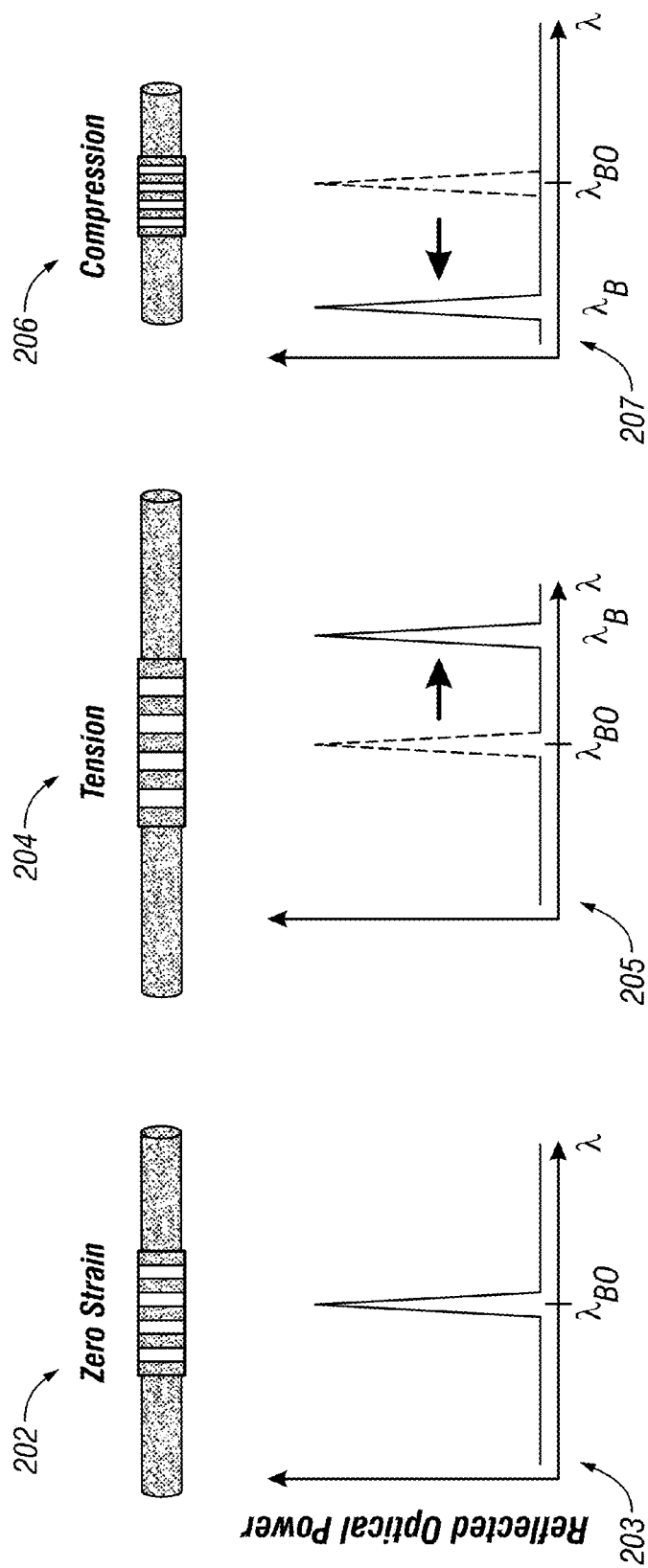

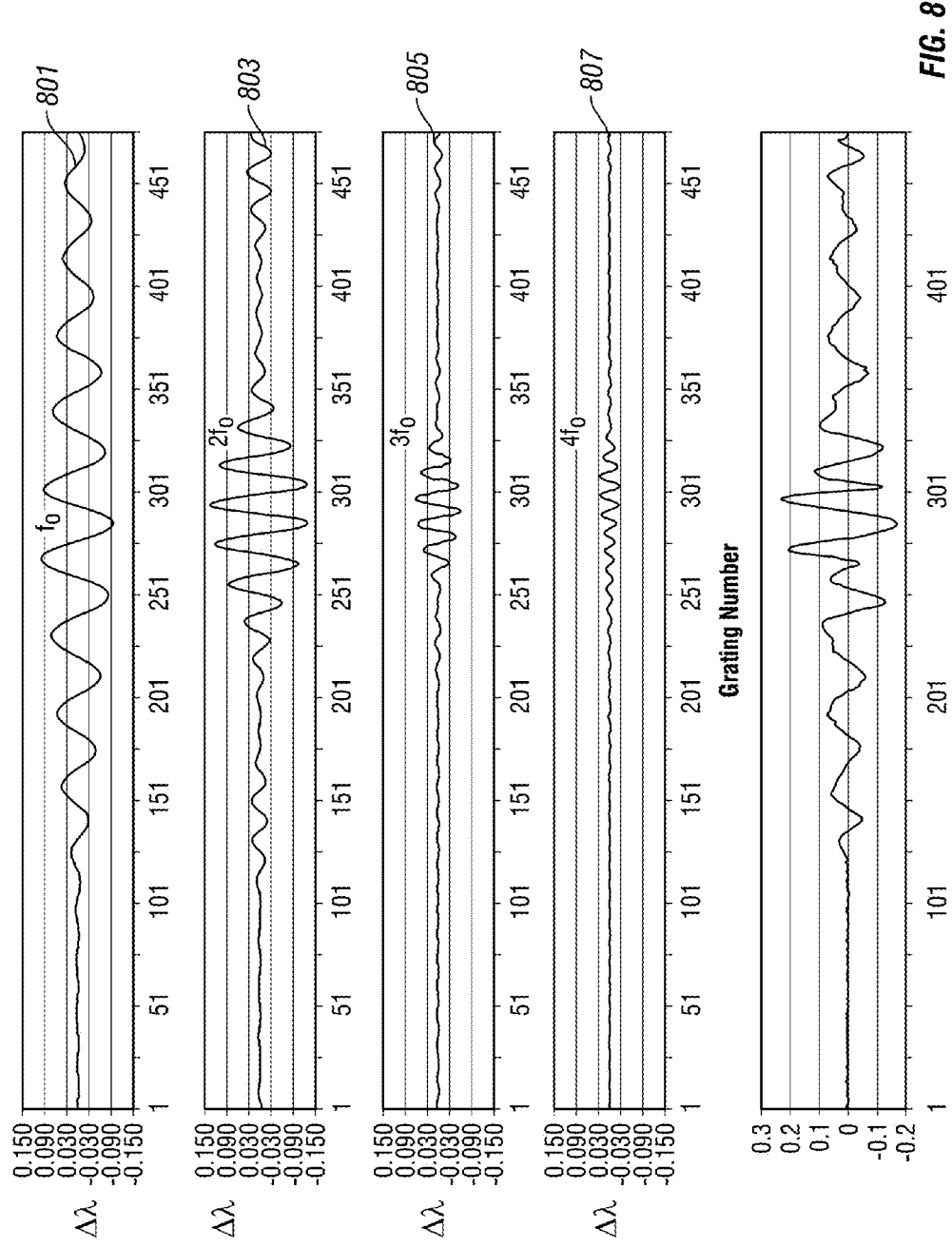

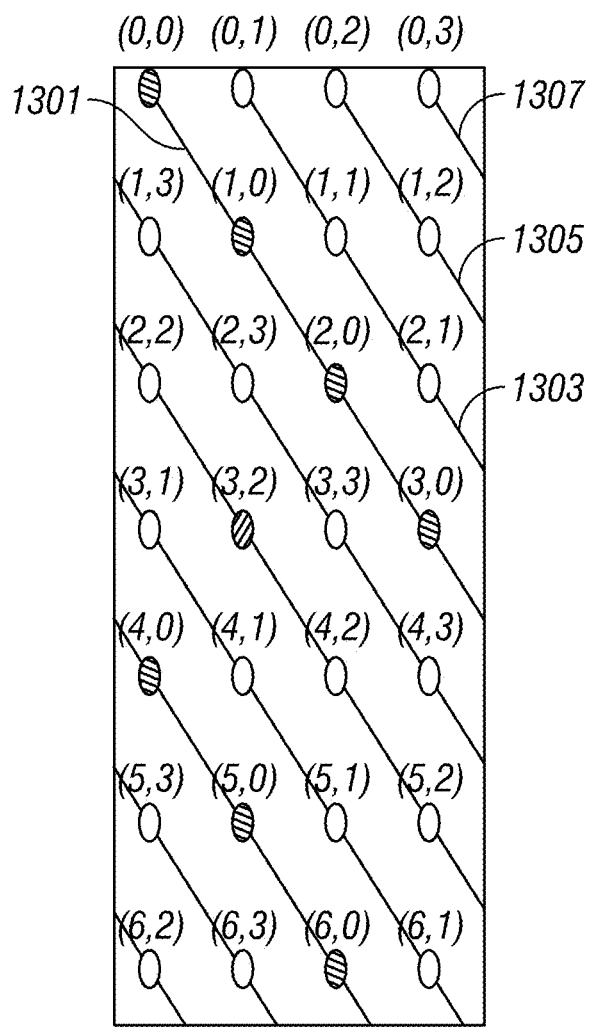 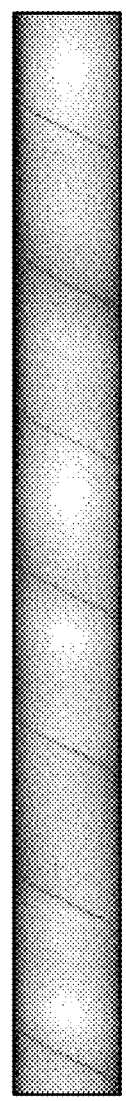
*FIG. 13A*  *FIG. 13B*

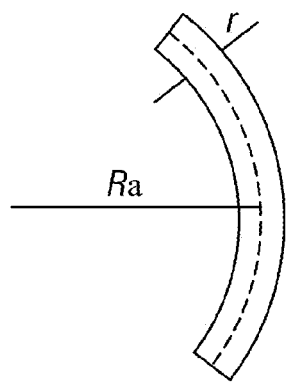
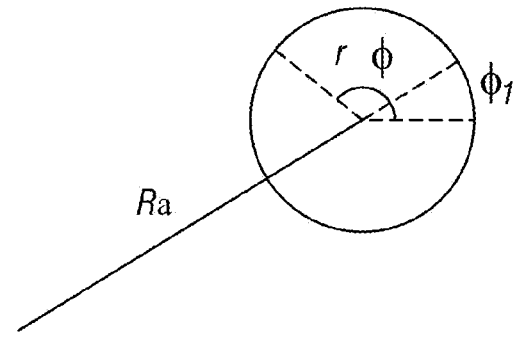
FIG. 14A  FIG. 14B
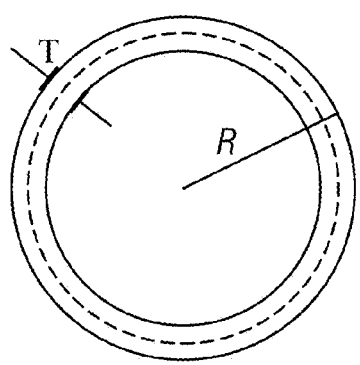
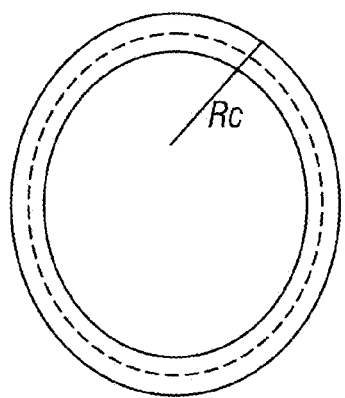
FIG. 15A  FIG. 15B

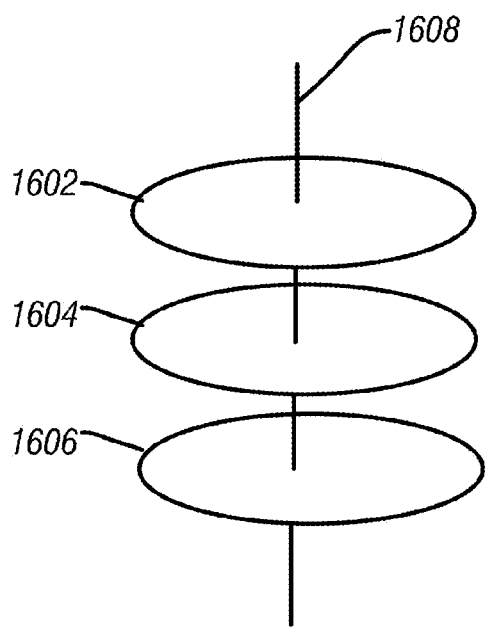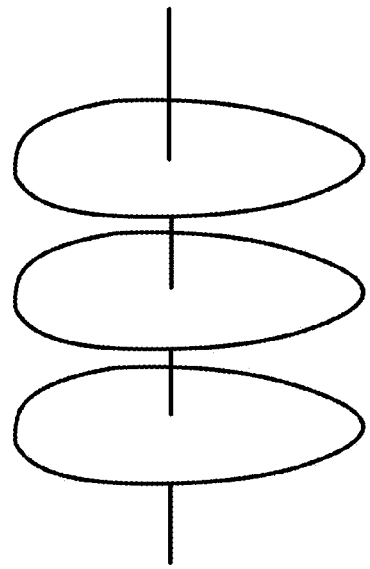
*FIG. 16A*    *FIG. 16B*
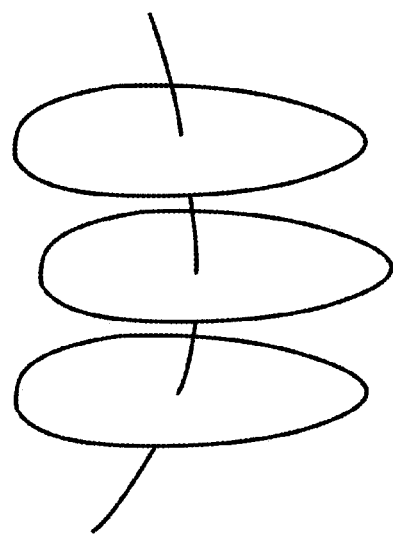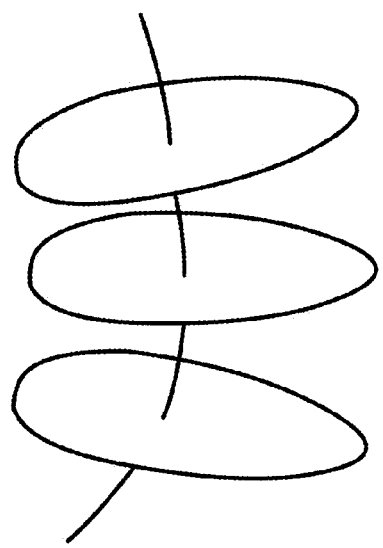
*FIG. 16C*    *FIG. 16D*

DETERMINATION OF STRAIN COMPONENTS FOR DIFFERENT DEFORMATION MODES USING A FILTER

CROSS REFERENCE TO RELATED APPLICATIONS

The present application is related to U.S. patent application Ser. No. 12/960,140, filed Dec. 3, 2010, U.S. patent application Ser. No. 12/959,862, filed Dec. 3, 2010, U.S. patent application Ser. No. 12/959,819, filed Dec. 3, 2010 (issued as U.S. Pat. No. 9,194,973), U.S. patent application Ser. No. 12/959,764, filed Dec. 3, 2010 (issued as U.S. Pat. No. 9,103,736), and U.S. patent application Ser. No. 12/959,781, filed Dec. 3, 2010, the contents of which are hereby incorporated herein by reference in their entirety.

BACKGROUND OF THE DISCLOSURE

1. Field of the Disclosure

The present application is related to methods for determining deformations on a tubular in a wellbore.

2. Description of the Related Art

Tubulars are used in many stages of oil exploration and production, such as drilling operations, well completions and wireline logging operations. These tubulars often encounter a large amount of stress, due to compaction, fault movement or subsidence, for example, which can lead to tubular damage or even to well failure. Well failures significantly impact both revenue generation and operation costs for oil and gas production companies, often resulting in millions of dollars lost in repairing and replacing the wells. Therefore, it is desirable to monitor wells to provide accurate, detailed information of their experienced stresses in order to understand the mechanisms of tubular failures.

Determining the deformation of a tubular under different stress distributions can be very complicated. In many cases, due to the unknown internal and external forces involved, it is not realistic to use pre-developed geometric models to simulate a deformation. There is therefore a need to obtain geometrical information of tubular stress from in-situ measurements.

SUMMARY OF THE DISCLOSURE

In one aspect, the present disclosure provides a method of determining a strain component for a deformation mode of a member, the method including: obtaining a plurality of measurements, each of the plurality of measurements related to a strain at a location of the member; selecting the deformation mode; and applying an adjustable filter to the plurality of strain measurements to determine the strain component for the selected deformation mode.

In another aspect, the present disclosure provides an apparatus for determining a strain component for a deformation mode of a member, the apparatus including a plurality of sensors, each sensor of the plurality of sensors configured to obtain a measurement of related to a strain at the member; and a processor configured to select a deformation mode and apply an adjustable filter to the plurality of strain measurements to determine the strain component for the selected deformation mode.

In yet another aspect, the present disclosure provides a computer-readable medium having stored thereon instructions that when read by a processor enable the processor to perform a method, the method comprising: obtaining strain measurements at a plurality of sensors, each of the plurality of measurements related to a strain at a location of the member; selecting the deformation mode; and applying an adjustable filter to the plurality of strain measurements to determine the strain component for the selected deformation mode.

Examples of certain features of the apparatus and method disclosed herein are summarized rather broadly in order that the detailed description thereof that follows may be better understood. There are, of course, additional features of the apparatus and method disclosed hereinafter that will form the subject of the claims.

BRIEF DESCRIPTION OF THE DRAWINGS

The present disclosure is best understood with reference to the accompanying figures in which like numerals refer to like elements and in which:

FIGS. 2A-C illustrates operation of a typical Fiber Bragg Grating;

FIG. 8 shows the separated strain components in the spatial domain for selected deformation modes;

FIG. 13A illustrates an exemplary gridding system for interpolating strains over a surface of a tubular;

FIG. 13B shows a three-dimensional image of the interpolated strains obtained using the exemplary gridding system of FIG. 13A;

FIGS. 14A-B show side and top views of a tubular undergoing a bending deformation;

FIGS. 15A-B show various parameters related to cross-sectional deformations;

FIGS. 16A-D illustrates an exemplary method of constructing a three-dimensional image of a tubular from estimated deformations;

DETAILED DESCRIPTION OF THE DISCLOSURE

Figure 1:
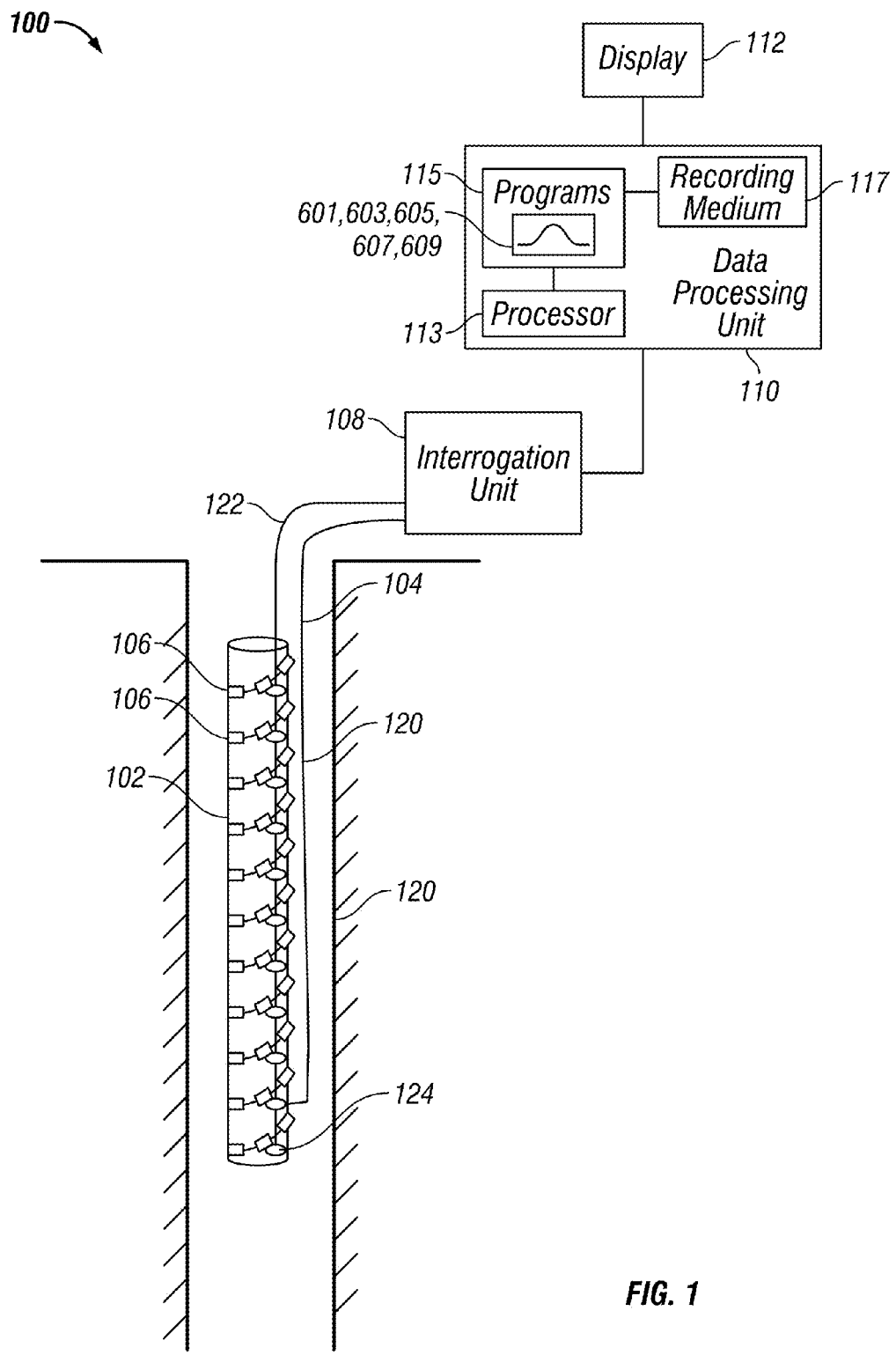
FIG. 1 illustrates a system for determining strain on a tubular disposed in a wellbore.

FIG. 1 shows an exemplary embodiment of a system 100 for determining a deformation of a tubular 102 disposed in a wellbore 120. The tubular may be any tubular typically used in a wellbore, such as a well casing or a drilling tubular, for example. In addition, the present disclosure is not limited to a tubular in a wellbore and can also be used on any exemplary member such as a casing, a sand screen, a subsea riser, an umbilical, a tubing, a pipeline, a cylindrical structure bearing a load and so forth. The exemplary member may undergo a variety of deformations. The exemplary member includes a plurality of sensors at various locations on the member. Each of the plurality of sensors obtains a measurement related to strain at the related location on the tubular. In various embodiments, the plurality of sensors may be Bragg grating sensors, Brillouin fiber optic sensors, electrical strain sensors, sensors along a fiber optic cable, or any other device for obtaining a strain measurement. In alternate embodiments, the obtained measurements related to strain may include, for example, a measurement of wavelength shift, a measurement of frequency change, and/or a measurement of a change in impedance. For the purposes of illustration, the member of the exemplary embodiment disclosed herein includes a tubular in a wellbore and the sensors are Fiber-Bragg gratings along a fiber optic cable helically wrapped around a surface of the tubular.

In the exemplary embodiment of FIG. 1, an optical fiber or fiber optic cable 104 is wrapped around the tubular 102. The fiber optic cable has a plurality of optical sensors, such as gratings or Fiber Bragg Gratings (FBGs) 106, along its length for detecting strains at a plurality of locations of the tubular. Exemplary operation of FBGs is discussed in relation to FIGS. 2A-C. The FBGs are spatially distributed along the optical fiber 104 at a typical separation distance of a few centimeters. The optical fiber 104 is wrapped at a wrapping angle such that any strain experienced along the tubular can be effectively transferred to the fiber. The present disclosure is not limited to sensors along a fiber at a particular wrapping angle. In other embodiments, the sensors may be linked by a linear fiber, a matrix, a grid, etc.

For the exemplary methods disclosed herein, each sensor or FBG is assigned a number (grating number) indicating its position along the optical fiber. An end of the fiber optic cable is coupled to an interrogation unit 108 typically at a surface location that in one aspect obtains a measurement from each of the FBGs to determine a wavelength shift or strain at each of the FBGs. In general, the interrogation unit 108 reads the plurality of gratings simultaneously using, for example, frequency divisional multiplexing. Interrogation unit 108 is coupled to a data processing unit 110 and in one aspect transmits the measured wavelength shifts to the data processing unit. In one aspect, the data processing unit 110 receives and processes the measured wavelength shifts from the interrogation unit 108 to obtain a result, such as a three-dimensional image of a tubular deformation, using the methods disclosed herein. A typical data processing unit 110 includes a computer or processor 113, at least one memory 115 for storing programs and data, and a recording medium 117 for recording and storing data and results obtained using the exemplary methods disclosed herein. The data processing unit 110 may output the result to various devices, such as a display 112, a suitable recording medium 117, the tubular 102, reservoir modeling applications or a control system affecting the strains.

FIGS. 2A-C illustrates operation of an exemplary Fiber Bragg Grating that may be used as a sensor on the exemplary tubular of FIG. 1. Optical fibers generally have a predetermined index of refraction allowing light to propagate through the fiber. A Fiber Bragg Grating is typically a section of the optical fiber in which the refractive index has been altered to have periodic regions of higher and lower refractive index. The periodic distance between the regions of higher refractive index is generally on the order of wavelengths of light and is known as the grating period, D. Typically, light enters the FBG from one end. As the light passes through the FBG, a selected wavelength of light is reflected. The wavelength of the reflected light is related to the grating period by:

$$\lambda_B = 2nD \qquad \text{Eq. (1)}$$

where $\lambda_B$ is the wavelength of the reflected light and is known as the Bragg wavelength, n is an effective refractive index of the grating, and D is the grating period. The FBG is typically transparent at other wavelengths of light.

FIG. 2A shows a typical operation of an FBG 202 that is in a relaxed state with no external forces applied. Graph 203 shows reflected optical power peaking at the "relaxed" Bragg wavelength, which may be denoted $\lambda_{B0}$ to indicate the wavelength of light reflected from the relaxed FBG 202. FIG. 2B shows FBG 204 under tension wherein the grating period D is increased, thereby increasing the wavelength of the light reflected by the FBG. This is shown in the shift of the reflected wavelength $\lambda_B$ from $\lambda_{B0}$ to higher wavelengths in graph 205. FIG. 2C shows FBG 206 under compression wherein the grating period D is decreased, thereby decreasing the wavelength at which light is reflected by the FBG, as shown in the shift of the reflected wavelength $\lambda_B$ from $\lambda_{B0}$ to lower wavelengths in the graph 207.

Returning to FIG. 1, when an FBG is attached to the tubular 102, strain experienced by the tubular at the point of attachment is transmitted to the FBG and consequently affects the spacing D of the FBG, thereby affecting the wavelength at which light is reflected from the FBG, as demonstrated in FIGS. 2A-C. Thus, the strain at the tubular is correlated with the wavelength shifts of the light reflected from the attached FBGs. Eq. (2) shows the correlation between the shift of wavelength $\Delta\lambda$ experienced by the FBG and the fiber strain $\epsilon_f$:

$$\Delta\lambda = \lambda_{B0}(1-P_e)K\epsilon_f \qquad \text{Eq. (2)}$$

where $\lambda_{B0}$ is the Bragg wavelength of the unstrained (relaxed) grating, $P_e$ is the strain effect on the refractive index, and K is a bonding coefficient. Using typical parameters of $\lambda_{B0} \sim 1552$ nm, $P_e \sim 0.22$ and $K \sim 0.9$ results in about 900 micro strain for each 1 nm shift. Eq. (2) can be rearranged as such:

$$\epsilon_f = \frac{\Delta\lambda}{\lambda_{B0}(1-P_e)K} \qquad \text{Eq. (3)}$$

so that strain calculations on the tubular can be obtained from $\Delta\lambda$ measurements. When considered as a whole the strains determined from the plurality of optical sensors can be used to determine deformations over the entire tubular as well as determining various modes of deformation which are discussed below.

A tubular undergoing a general deformation experiences one or more deformation modes. Exemplary deformation modes include compression/extension, bending, ovalization, triangularization, and rectangularization modes. Each deformation mode, in turn, has an associated spatial frequency related to the strains obtained at the plurality of FBGs and which can be seen by creating a dataset such as by graphing the wavelength shifts $\Delta\lambda$ obtained at the plurality of FBGs against the grating numbers of the FBGs, as seen for example in FIG. 4. A determined mode can be used to obtain a result, such as determining an overall deformation of the tubular, a bending radius of the tubular, a three-dimensional image of the tubular, etc. The present disclosure determines a deformation of a tubular based on at least five fundamental deformation modes: compression/extension, bending, ovalization, triangularization, and rectangularization, which are explained below. The methods disclosed herein are not limited to these particular modes of deformation and can be applied to higher-order modes of deformation.

The compression/extension deformation mode occurs when a tubular experiences a compressive or tensile force applied in the axial direction. Such a force affects both the tubular axis and the circumference of the tubular. For example, as the tubular is shortened along the axial direction under a compressive force, the circumference expands outward to accommodate. As the tubular is lengthened along the axial direction under a tensile force, the circumference constricts inward to accommodate. The strain for this deformation mode is generally uniformly distributed along the surface in either the axial or orthogonal (circumferential) direction. The distribution may also depend on tubular geometry tubular condition and magnitude of strain. The strain in the axial direction is referred to as the principal strain. The strain in the orthogonal direction is referred to as the secondary strain and has a value proportional to the principal strain as described by:

$$\epsilon_{secondary} = \nu \epsilon_{principal} \quad \text{Eq. (4)}$$

where v is the Poisson's ratio, which is an inherent property of the material. Since the strain for a compression or tensile force is uniformly distributed over the tubular, FBGs located at all locations on the tubular tend to experience the same corresponding wavelength shift.

Figure 3B:
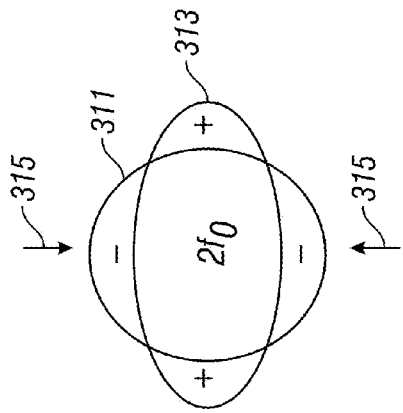
FIGS. 3A-D show various modes of deformation on a tubular.
Figure 3D:
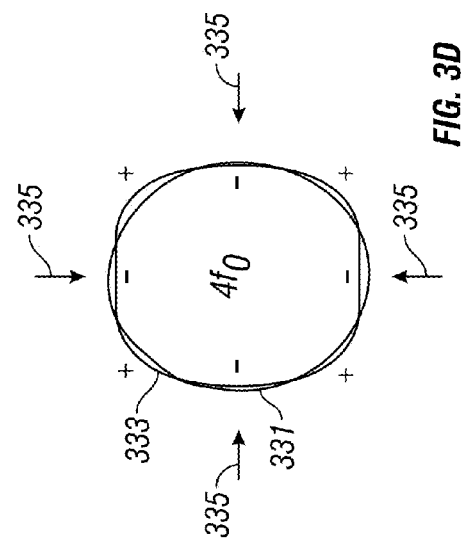
Figure 3A:
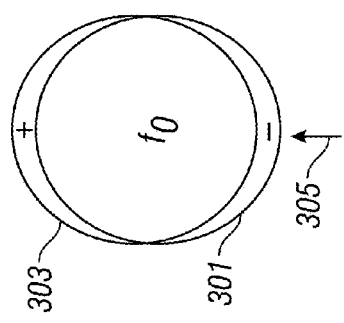

The bending mode of deformation, shown in FIG. 3A, occurs when an external force is applied perpendicular to the axial direction of a tubular. In production wells, compaction, fault movement and subsidence can all cause a well to bend. The distribution of the bending strain is anisotropic in the radial direction as shown in FIG. 3A. Circle 301 is a top cross-section view of a tubular under no applied force. Circle 303 is a top cross-section view of the same tubular with a force 305 applied. The plus signs (+) indicate the portion of the tubular under tension and the minus signs (−) indicate the portion of the tubular under compression. While negative strains (−) are built up on the surface near to the point at which the bending force is applied, the positive strains (+) are built up on the opposite surface area. Therefore, FBGs near the (+) signs experience a positive wavelength shift Δλ and FBGs near the (−) signs experience a negative Δλ. In a graph of Δλ vs. grating number, the Δλ from the bending mode forms a sinusoidal wave having a given (spatial) wavelength that is the length of a wrap of the fiber around the tubular. The spatial frequency of the bending mode is referred to herein as the characteristic frequency of the system. The principal strain of bending ($\epsilon_{bending}$) is in the axial direction, similar to compression/extension. However, the principal strain depends on the radius of curvature and the bending azimuth angle. The secondary bending strain ($\epsilon_{transe}$) is in the orthogonal direction and is related to the principal strain by:

$$\epsilon_{transe} = \nu \epsilon_{bending} \quad \text{Eq. (5)}$$

Figure 3C:
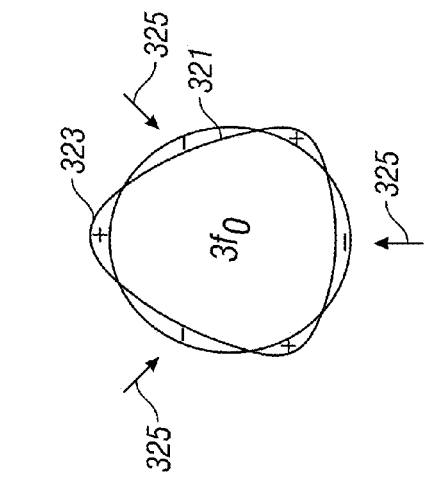

The other deformation modes (i.e., ovalization, rectangularization and triangularization) are referred to as cross-sectional deformations since they lead to changes in the shape of the cross-section. These deformation modes are shown in FIGS. 3B-3D. FIG. 3B shows the effects of a tubular undergoing an ovalization mode of deformation. Circle 311 represents a top cross-section of a tubular under no applied force. Curve 313 represents a top cross-section of the same tubular with an ovalization force applied, such as forces 315. The plus signs (+) indicate where the tubular expands outward from its relaxed state under the applied force, and the minus signs (−) indicate where the tubular recedes inward from its relaxed state under the applied force. A typical ovalization deformation mode can occur when two external forces are applied perpendicular to the axis of a tubular in a symmetric manner, such as forces 315. In a wellbore, ovalization can be caused by various forces such as anisotropic shear forces in rock or fluids. The ovalization deformation mode usually dominates over other cross-section deformation modes, such as triangularization and rectangularization. The principal strain component ($\epsilon_{oval}$) of the ovalization mode is in the transverse direction. The secondary strain component ($\epsilon_{axis}$) in the axial direction is related by:

$$\epsilon_{axis} = -\nu \epsilon_{oval} \quad \text{Eq. (6)}$$

In a graph of Δλ vs. grating number, an ovalization mode forms a sinusoidal wave with a frequency that is double the characteristic frequency of the bending deformation.

FIG. 3C shows the effects on a tubular undergoing a triangularization mode of deformation. Circle 321 represents a top cross-section of a tubular under no applied force. Curve 323 represents a top cross-section of the same tubular with a triangularization force applied. The plus signs (+) indicate where the tubular expands outward from its relaxed state under the applied force, and the minus signs (−) indicate where the tubular recedes inward from its relaxed state under the applied force. The triangularization deformation mode occurs when three external forces are applied perpendicular to the axis of a rigid tubular in a manner as shown by forces 325. In a graph of Δλ vs. grating number, the triangularization mode forms a sinusoidal wave with a frequency that is three times the characteristic frequency of the bending deformation.

FIG. 3D shows the effects of a tubular undergoing a rectangularization mode of deformation. Circle 331 represents a top cross-section of a tubular under no applied force. Curve 333 represents a top cross-section of the same tubular with a rectangularization force applied. The plus signs (+) indicate where the tubular expands outward from its relaxed state under the applied force, and the minus signs (−) indicate where the tubular recedes inward from its relaxed state under the applied force. Rectangularization deformation occurs when four external forces are applied perpendicular to the axis of the tubular in a symmetric manner such as forces 335. In a graph of Δλ vs. grating number, the rectangularization mode forms a sinusoidal wave with a frequency that is four times the characteristic frequency.

Given these deformation modes and their related strains, the total strain at a given point of the tubular is a result of the combination of the strains from the deformation modes. The overall strain is given in Eq. (7):

$$\varepsilon_f = -1 + (1 + \alpha_T \Delta T_c) \cdot \sqrt{\begin{array}{l} \cos^2\theta((1-\nu\varepsilon_c)(1-\nu\varepsilon_b)(1+\varepsilon_o)(1+\varepsilon_t)(1+\varepsilon_r))^2 + \\ \sin^2\theta((1+\varepsilon_c)(1+\varepsilon_b)(1-\nu\varepsilon_o)(1-\nu\varepsilon_t)(1-\nu\varepsilon_r))^2 \end{array}} \quad \text{Eq. (7)}$$

where $\epsilon_c$, $\epsilon_b$, $\epsilon_o$, $\epsilon_t$ and $\epsilon_r$ represent respectively the strains for compression/extension, bending, ovalization triangularization and rectangularization, $\alpha_T$ is the linear thermal expansion coefficient of the tubular material, $\theta$ is the wrapping angle of the fiber which thereby indicates a particular location on the tubular, and $v$ is the Poisson's ratio. For steels, $\alpha_T$=31.5 $\mu$S/° C. Since the sensing fiber can be permanently damaged if it experiences a strain exceeding 1-2%, it is possible to expand the radical term of Eq. (7) and ignore higher level terms to obtain:

$$\varepsilon_f = \alpha_T \Delta T_c + (1 + \alpha_T \Delta T_c) \cdot \begin{bmatrix} (\sin^2\theta - v\cos^2\theta)(\varepsilon_c + \varepsilon_b) + \\ (\cos^2\theta - v\sin^2\theta)(\varepsilon_o + \varepsilon_t + \varepsilon_r) \end{bmatrix} \quad \text{Eq. (8)}$$

As seen in Eq. (8), for small strains, the strain contributions from different deformation modes are additive.

Figure 4:
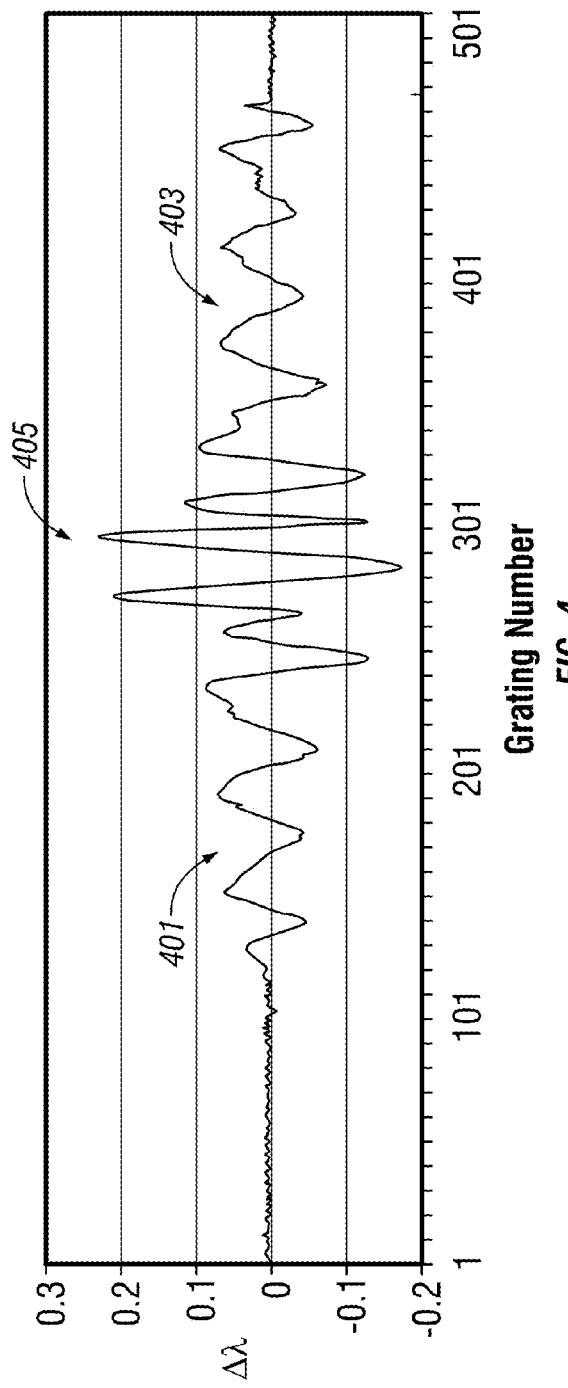
FIG. 4 shows an exemplary set of strain data obtained from a tubular using the system of FIG. 1.
Figure 5:
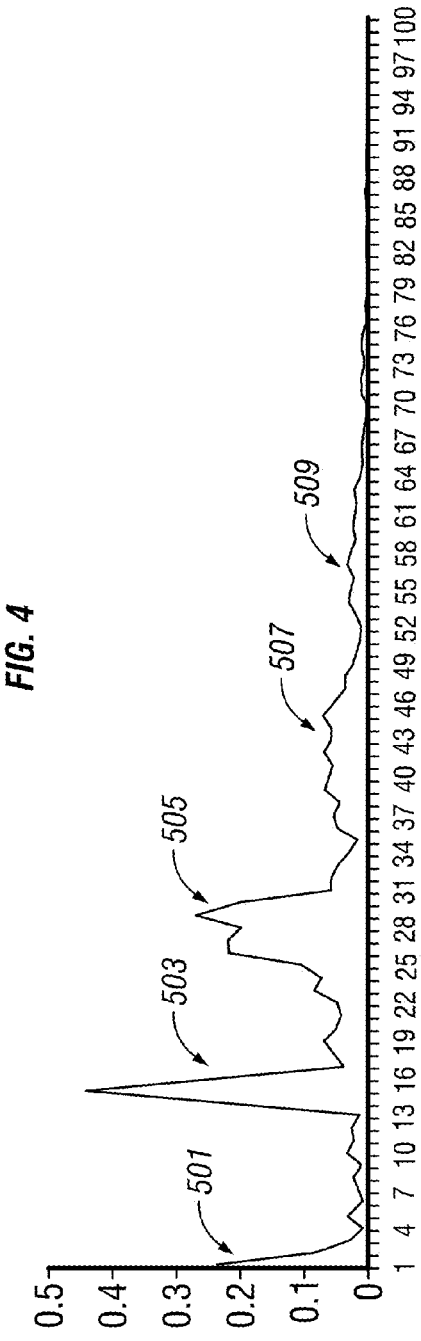
FIG. 5 shows a frequency spectrum of the exemplary strain data of FIG. 4.

As discussed above, each deformation mode of tubular 102 is apparent on a graph of wavelength shift at each FBG against the FBG grating number. An exemplary graph of wavelength shift vs. grating number is shown in FIG. 4. The grating number of each FBG is shown along the abscissa and the change of wavelength $\Delta\lambda$ is plotted along the ordinate. The graph displays some regions 401 and 403 which display primarily a single characteristic frequency, which in this case indicates a dominant bending mode at those FBGs and region 405 in which the frequency is double the characteristic frequency which indicates at least an ovalization mode of deformation in addition to the bending mode. As noted, the graph displays a periodic nature. In one aspect, the exemplary methods described herein uses a spectral decomposition of the graph to separate out components of the graph and then to correlate the separated components with their deformation modes. As shown in FIG. 5, a (spatial) frequency spectrum may be obtained based on the strain measurements and peaks of the spectrum may be separated to separate each deformation mode in frequency space.

FIG. 5 shows a frequency spectrum of the exemplary dataset of FIG. 4. In the example of FIG. 5, the frequency spectrum is obtained using a transform into a frequency space, such as a Discrete Fast Fourier Transform (DFFT), but any suitable method for obtaining a frequency spectrum may be used. The spectrum shows several peaks, each peak corresponding to a separate deformation mode such as compression/tension 501, bending 503, ovalization 505, triangularization 507, and rectangularization 509. The bending peak 503 has a higher intensity and a narrower bandwidth than those of the various cross-section deformation modes (ovalization 505, triangularization 507 and rectangularization 509). The bandwidth of the peaks becomes wider as the frequency becomes higher, indicating the strain component in the spatial domain has a shorter range of strain distribution.

Figure 6:
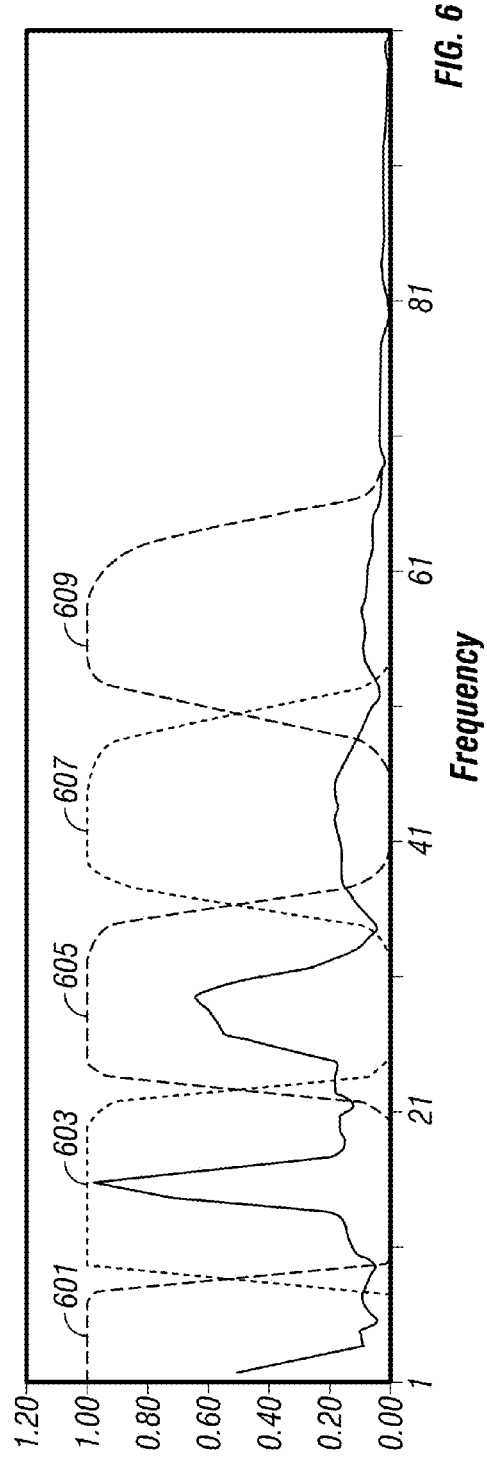
FIG. 6 shows an exemplary bandpass filter that may be applied to the frequency spectrum of FIG. 5 to select a deformation mode.

A filter may be applied to the frequency spectrum of FIG. 5 to selected frequency peaks related to a deformation mode. FIG. 6 shows exemplary bandpass filters that may be applied to the frequency spectrum of FIG. 5 to separate peaks. As can be seen in FIG. 6, each bandpass filter 601, 603, 605, 607 and 609 covers its corresponding peak. Eq. (9) is an equation of an exemplary bandpass filter that may be used herein and has a frequency response of:

$$G(s,k) = \frac{\rho^{2n}(k-1)}{(1+\rho^{2n}(k-1))(1+\rho^{2n}(k))} \quad \text{Eq. (9)}$$

with $$\rho(k) = \frac{s}{s_c(k)} \quad \text{Eq. (10)}$$

where $s$ is the complex frequency and $s_c$ is the cutoff frequency. The parameter n defines an attenuation of the frequency or, in other words, a degree of the overlap between neighboring modes, and k is an index for selecting the deformation mode defined as $$k = \begin{cases} -1 & \\ 0 & \text{compression/extension} \\ 1 & \text{bending} \\ 2 & \text{for} \quad \text{ovalization} \\ 3 & \text{triangularization} \\ 4 & \text{rectangularization} \end{cases}$$

The exemplary band-pass filter of Eq. (9) is characterized by 100% gain in the center area of each band with no "ripple" effect; maximally flat (or minimal loss) in the pass band; smoothed channel output allowing direct numerical calculation of first derivatives; ability to perform a filtering with introducing phase shift; and adjustability for data collected from various sensing fibers having different wrap angles.

Figure 7:
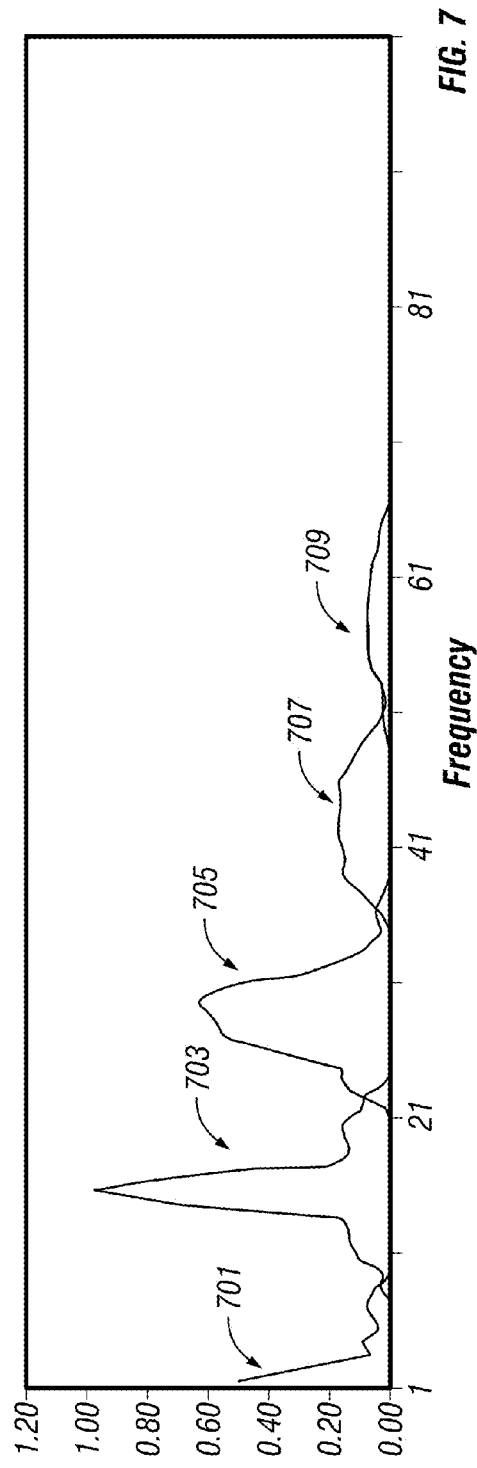
FIG. 7 shows the separated peaks for deformation modes after applying the exemplary bandpass filter of FIG. 6.

The bandpass filter is applied to select a peak. FIG. 7 shows the separated peaks for the five deformation modes having been separated by applying the exemplary bandpass filter. These peaks are related to compression/tension 701, bending 703, ovalization 705, triangularization 707, and rectangularization 709. There are slight overlaps between the neighboring deformation modes. Adjusting the value of n in Eq. (9) controls the degree of overlap so that satisfactory separation of the modes can be achieved. Application of an inverse transform yields the separate graphs of strains (wavelength shifts) shown in FIG. 8 that relate to the various deformation modes. FIG. 8 shows the separated strain components in the spatial domain obtained from the separated peaks of FIG. 7. Bending 801, ovalization 803, triangularization 805 and rectangularization 807 modes are separately shown. Relative strengths of the five deformation modes are apparent from the amplitudes.

In an alternate embodiment, a bandpass filter that correlates in the spatial domain to the exemplary filter of the spectral domain described above may be applied. The domain in which the filter is applied may be selected to reduce computation expense, for example. The corresponding transfer function H(s,k) in the spatial domain to the bandpass filter of Eq. (9) can be derived from the equation $$G^2(s,k) = H(s,k)H(-s,k) \quad \text{Eq. (11)}$$

to construct a digital filter with no phase shift used the following condition:

$$H(s,k) = H(-s,k) \quad \text{Eq. (12)}$$

thereby leading to the following transfer function in real space:

$$H(j,k) = \frac{\rho^{2n}(k-1)}{(1+\rho^{2n}(k-1))(1+\rho^{2n}(k))} \quad \text{Eq. (13)}$$

where

-continued $$\rho(k) = \frac{j}{j_c(k)}$$ Eq. (14)

and $$j_c(k) = (2k+1)*M/N$$ Eq. (15)

where j is the frequency represented by the point index in the DFFT spectrum, $j_c$ is the cutoff frequency, M is a total number of measurements and N is a total number of sensors in a single wrap of the member, also referred to herein as the wrap number of the grating fiber.

Figure 9A:
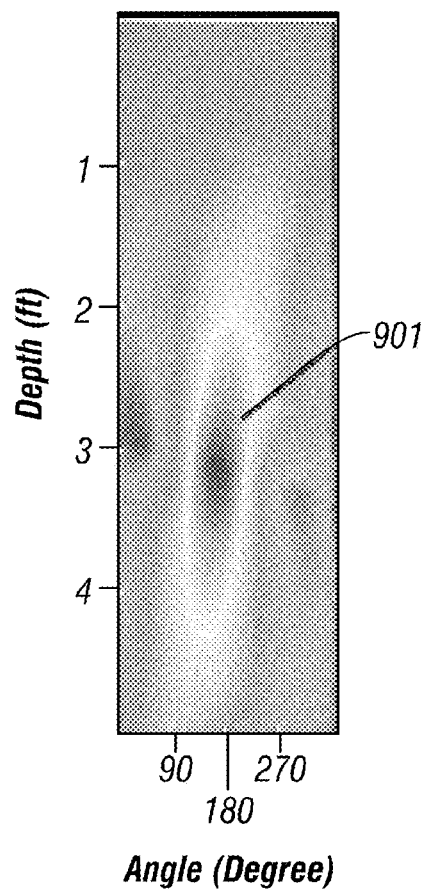
FIGS. 9A and B show an exemplary bending strain data on a tubular before and after a calibration.
Figure 9B:
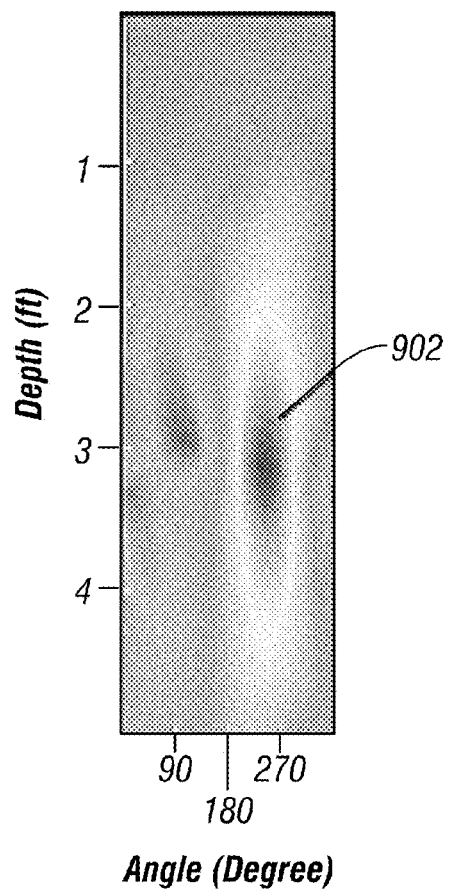

In one embodiment, a bending calibration may be performed. Under an applied bending force, the tubular bends along a known azimuth deformation angle over the entire tubular. Obtaining bending data provides information on average number of gratings in each wrap and identification of the grating in each individual wrap. In addition, one may visually correct data using a calibrated 2D strain map of the bending data, such as shown in FIGS. 9A and B. FIGS. 9A and B show a bending strain data on a tubular before and after calibration. FIG. 9A shows non-perpendicular strain bands 901. When the system is calibrated as in FIG. 9B, the strain bands 902 of the 2D map are perpendicular to the y-axis.

The location of a grating on the tubular is determined by wrap angle, the outer-diameter of the tubular and inter-grating spacing. Systematic errors in any of these are accumulative, such that an error on the location of a particular grating contributes to errors on all subsequent gratings. For an exemplary wrapped fiber having total 400 Bragg gratings and with 40 gratings in each wrap, the error on azimuth angle for the last wrap may be as big as 36°, even if the systematic error is only 1%. To meaningfully determine the azimuth angle, the location of the fiber on the tubular is allocated according to the exemplary methods described herein.

Figure 10:
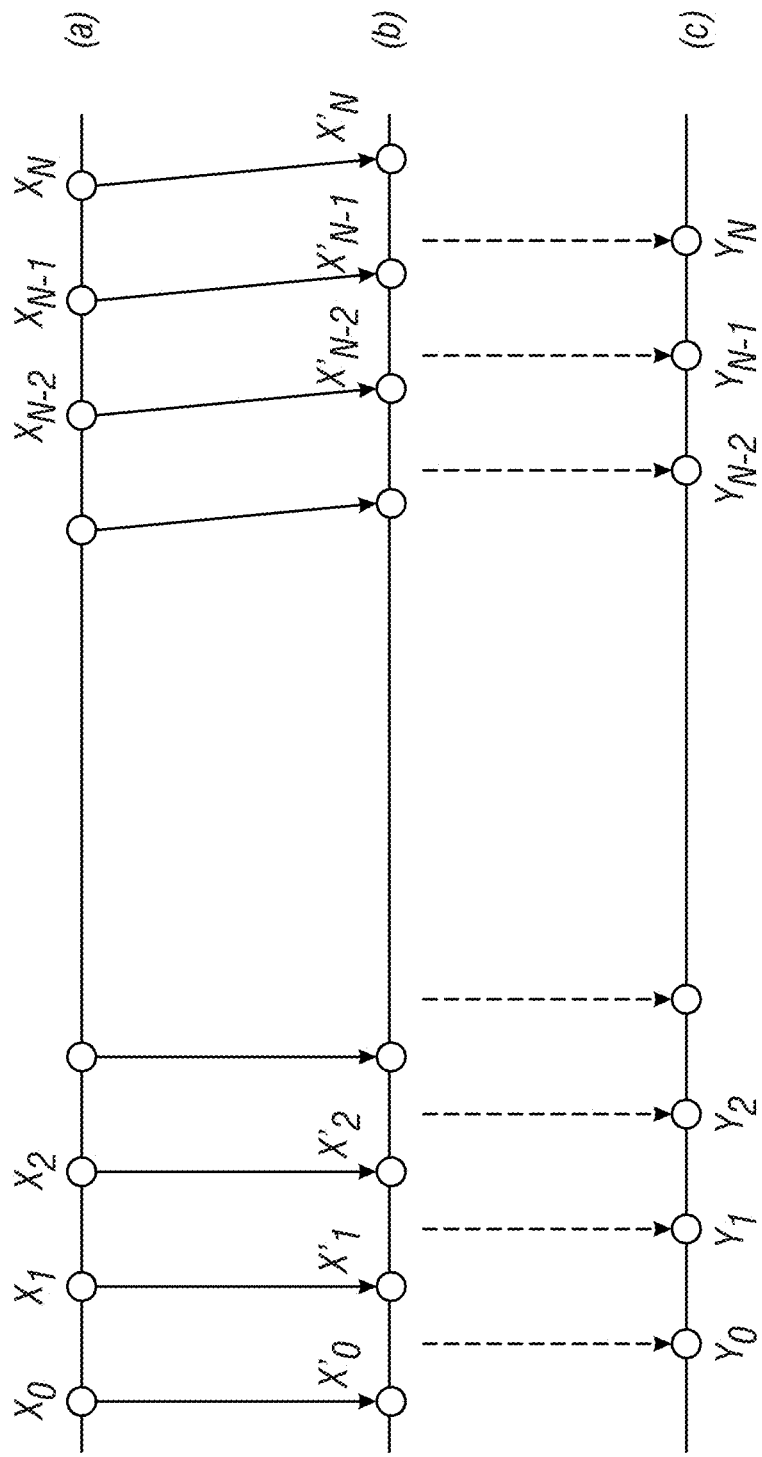
FIG. 10 illustrates a system for mapping strains from a location in a fiber optic cable to a location on the tubular.

FIG. 10 shows an illustrative system for mapping gratings from a location in a fiber optic cable to a particular location on the tubular. Bragg grating locations are in the fiber are indicated by dots labeled $(x_1, x_2, \ldots, x_N)$ and are referred to as fiber locations. The tubular surface locations are indicated by dots $(y_1, y_2, \ldots, y_N)$ and are the determined tubular locations for later use in numerical processing and surface construction. The tubular locations are generally selected such that an integer number of gratings are evenly distributed in each wrap and along the pipe surface.

In one embodiment, two steps are used in order to determine a tubular location from the fiber location. In a first step, corrections are made for inaccuracies in tubular diameter or wrap angle using, for instance, the exemplary calibration methods described above. If $(x_0, x_1, \ldots, x_N)$ are respectively the measured fiber locations in the sensing fiber, each grating space measured is multiplied by a factor k that is determined either from a heating string correction data or is obtained by taking k as adjustable parameter to align bending correction strain. This therefore maps the fiber location $(x_0, x_1, \ldots, x_N)$ to an intermediate calculated location $(x'_0, x'_1, \ldots, x'_N)$.

Figure 11:
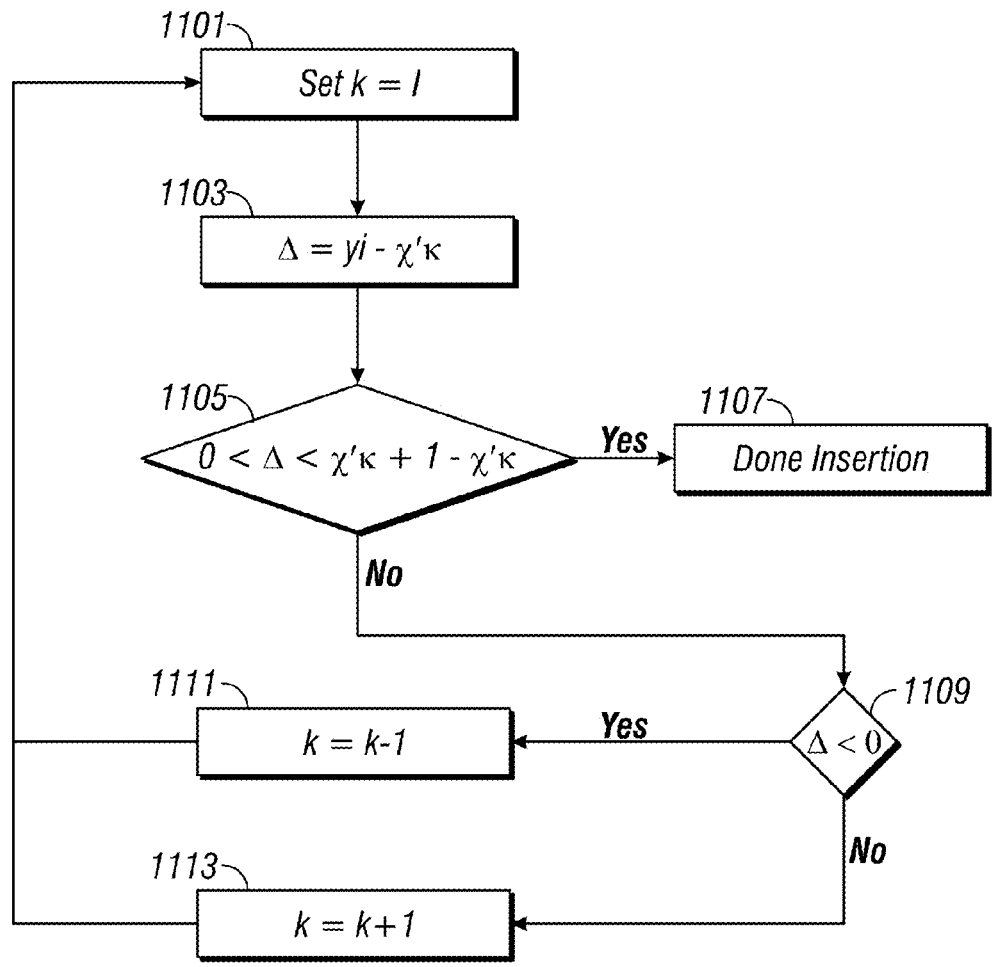
FIG. 11 shows an exemplary method for mapping data from a fiber optic cable location to a location on a tubular surface according to the exemplary system of FIG. 10.

A second step is to map the data to corrected locations onto the tubular surface location as shown in the exemplary insertion method of FIG. 11. In Box 1101, the index k for the grating location is set to the index i for the surface location. In Box 1103 a difference Δ is determined between the grating location and the calculated location. In Box 1105, if this difference is less than a spacing between adjacent calculated locations, the insertion process is concluded (Box 1107). Otherwise, in Box 1109, it is determined whether Δ is negative. If the Δ<0, then the index k of the grating location is decreased by one and the method repeats from Box 1101. If the Δ≥0, then the index k of the grating location is increase by one and the method repeats from Box 1101.

Figure 12A:
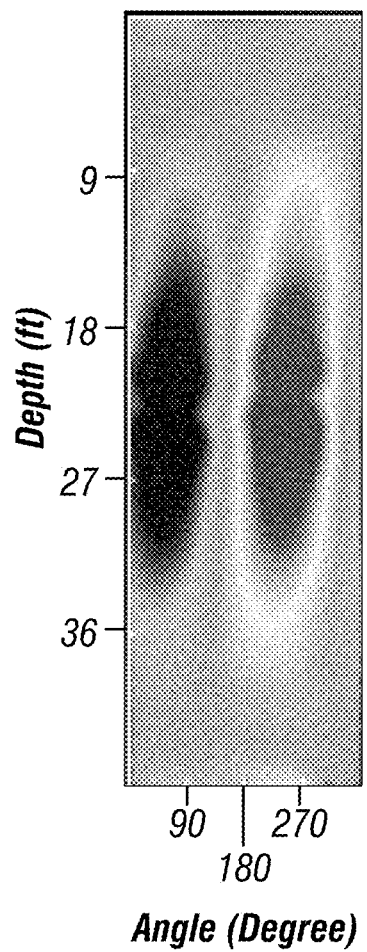
FIGS. 12A and 12B show exemplary strain maps obtained before and after application of the exemplary mapping of FIGS. 10 and 11.
Figure 12B:
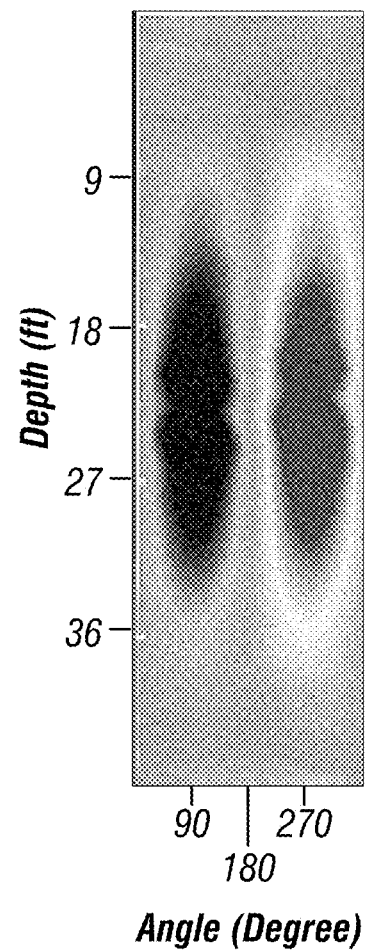

FIGS. 12A and 12B show exemplary strain maps before and after the exemplary grating location correction just described. The strains of FIG. 12A which exhibit a deviation from the vertical are substantially vertical in FIG. 12B after the correction is applied.

FIG. 13A illustrates an exemplary gridding system for strain interpolation that may be used with a fiber optic cable with optical sensors wrapped along the surface of a tubular. The length of the pipe is indicated along the vertical axis and the circumference is shown along the horizontal axis from 0° to 360°. The first wrapped curve 1301 indicates a fiber optic cable. The points on the first wrapped curve 1301 indicate the location of the FBGs of the wrapped fiber. These points are referred to as grating points with respect to FIG. 13A. The fiber optic cable wraps around the circumference such that an integral number of grating points are included in a single wrap. An integral number of wrapping curves 1303, 1305, 1307 are then inserted and points on the inserted curves are referred to as gridding points. Each point on the grid is indicated by two indices indicating their position in a two dimension space. The first index indicates a position of the point along a given curve. The second index indicates which wrapping curve the point belongs to. For example, point (2,0) is the second grating point of curve 1301. Grating points typically are identified by having second indices which are equal to zero.

The strain of a gridding point can be calculated from the values of the neighboring grating points by using an exemplary linear interpolation method of Eq. (16).

$$\epsilon_{i,j} = [j\epsilon_{i+j,0} + (N-j)\epsilon_{i+j-N,0}]/N$$ Eq. (16)

where N is the number of gratings in each wrap. For simplicity, the two nearest grating points in the same column may be used to calculate a strain at a gridding point. Using the example of Eq. (16) to gridding point (3,2) of FIG. 13A, the strain at gridding point (3,2) is given by $\epsilon_{3,2} = [\epsilon_{5,0} + \epsilon_{1,0}]/2$. In addition to the exemplary interpolation method of Eq. (16), a number of interpolations may be used. FIG. 13B shows a three-dimensional image with surface color representing the interpolated strains on the tubular. The surface color changes from blue to red, corresponding to the change of the surface strains from maximum negative to positive.

Once the deformation modes are separated as described using the exemplary methods described herein and strains are mapped to a tubular surface, the strains can be applied in iterative processes to yield in one aspect a geometrical data for the bending mode of the tubular and in another aspect geometrical data for the cross-sectional deformations of the tubular. The obtained geometrical data can be used to obtain a three-dimensional image of the tubular which can be useful in determining a wear or condition of the tubular.

A method of determining geometrical data for the bending deformation mode is now discussed. FIG. 14A shows a side view of an exemplary tubular undergoing a bending force. The tubular has a radius r and a bending radius of curvature $R_a$. Over a sufficiently short section of a tubular, the length of the neutral (strain-free) axis of the tubular remains constant during the bending process. FIG. 14B shows a top view cross-section of the tubular of FIG. 14A. The radius of curvature $R_a$, the radius of the tubular r, the azimuthal position coordinate of the tubular φ and the bending azimuth angle $\phi_1$ are shown. The two deformation parameters (the radius of curvature $R_a$ and the bending azimuth angle $\phi_1$) describe the magnitude and the direction of the bending and are related to the bending strain through:

$$\varepsilon_b = \frac{r}{R_a}\cos(\phi - \phi_1) \qquad \text{Eq. (17)}$$

where r and $\phi$ are position coordinates of the tubular and $\phi_1$ is the bending azimuthal angle. Thus the bending strain such as obtained in FIG. 8 can be selected at each point to determine $R_a$ and $\phi_1$ at a selected point on the tubular.

An exemplary numerical process for obtaining geometrical data from the deformation parameters $R_a$ and $\phi_1$ is now discussed. In the numerical process, bending strain can be represented by a two-dimensional vector $\vec{\epsilon}_b$ lying within a cross-section perpendicular to the axis of the tubular such as the cross-section of FIG. 14B. The bending strain can be decomposed into two components that point respectively to the x and y direction, wherein x and y directions are defined to be in the cross-sectional plane:

$$\vec{\varepsilon}_b = \vec{\varepsilon}_{bx} + \vec{\varepsilon}_{by} \qquad \text{Eq. (18)}$$

with $$\vec{\varepsilon}_{bx} = \frac{x}{R_x}\hat{i} \text{ and } \vec{\varepsilon}_{by} = \frac{y}{R_y}\hat{j} \qquad \text{Eqs. (19)}$$

Eqs. (17)-(19) can be combined to obtain the following equations:

$$\varepsilon_{bx} = \varepsilon_b \cos\phi - \frac{\partial \varepsilon_b}{\partial \phi}\sin\phi \qquad \text{Eqs. (20)}$$

$$\varepsilon_{by} = \varepsilon_b \sin\phi + \frac{\partial \varepsilon_b}{\partial \phi}\cos\phi$$

$$R_a = \frac{r}{\sqrt{\varepsilon_b^2 + \left(\frac{\partial \varepsilon_b}{\partial \phi}\right)^2}}$$

Various methods are known for calculating $$\frac{\partial \varepsilon_b}{\partial \phi},$$

the first derivative of the bending strain with respect to the azimuth angle. From Eq. (20), once $\epsilon_b$ and $$\frac{\partial \varepsilon_b}{\partial \phi}$$

are known, the values of the strain components $\vec{\epsilon}_{bx}$ and $\vec{\epsilon}_{by}$ can then be calculated. The bending parameters $R_x$ and $R_y$, which are x and y components of $R_a$, may then be calculated from Eq. (19) and (20). $R_x$ and $R_y$ are related to the axial bending variable by:

$$R_x = \frac{(1 + z_x'^2)^{3/2}}{z_{xx}''} \qquad \text{Eqs. (21)}$$

$$R_y = \frac{(1 + z_y'^2)^{3/2}}{z_{yy}''}$$

where z is the axial coordinate of the tubular. Once $R_x$ and $R_y$ are known, one can numerically solve Eqs. (21) to obtain geometrical data for bending.

In one aspect, the axial bending deformation can be calculated by numerically solving the Eqs. (21) using selected boundary conditions for the tubular. The most commonly applied boundary conditions are:

$$z_x'(z=0) = z_y'(z=0) = 0$$

$$x(z=0) = x(z=l) = 0$$

$$y(z=0) = y(z=l) = 0 \qquad \text{Eqs. (22)}$$

where z=0 and z=l are the z coordinates of the end points of the axis of the tubular. Eqs. (22) holds true if the bending occurs only in the sensing section and the casing is significantly longer than the sensing section. Using the mathematical groundwork of Eqs. (17)-(22), the iterative process for obtaining geometrical data for the bending deformation is discussed below in reference to Eqs. (23)-(27).

Referring to FIG. 1, each grating of the fiber optic cable is assigned a grating number i=1 to N, where N is the total number of gratings. The position of the grating i is a function of its wrapping angle and can be written in the coordinates x(i), y(i), z(i) with first derivatives given by $x_z'(i)$ and $y_z'(i)$. The first derivative for the i+1$^{th}$ grating can be calculated from the coordinates and derivatives of the i$^{th}$ grating using Eqs. (23):

$$x_z'(i+1) = x_z'(i) + \frac{(1 + x_z'(i)^2)^{3/2}}{R_x} * dz \qquad \text{Eqs. (23)}$$

$$y_z'(i+1) = y_z'(i) + \frac{(1 + y_z'(i)^2)^{3/2}}{R_y} * dz$$

with $$dz = d * \sin\theta \qquad \text{Eq. (24)}$$

wherein d is the spacing between gratings and $\theta$ is the wrapping angle of the fiber optic cable. The position of the i+1$^{th}$ grating is therefore determined by:

$$x(i+1) = x(i) + x_z'(i+1) * dz$$

$$y(i+1) = y(i) + y_z'(i+1) * dz \qquad \text{Eqs. (25)}$$

Thus, in one aspect, the numerical solution begins with a first point such as x(0), y(0), z(0), in which its position and first derivatives are known from the boundary conditions and uses Eqs. (23)-(25) to obtain x(N), y(N), z(N) through N iterations. The coordinates of the N$^{th}$ grating is compared with the boundary conditions. If the difference between them is greater than a selected criterion, the initial guess on the boundary condition derivatives of the first point is modified using Eqs. (26):

$$x_z'(0) = x_z'(0) + (x(N) - x_N) * 2/N$$

$$y_z'(0) = y_z'(0) + (y(N) - y_N) * 2/N \qquad \text{Eqs. (26)}$$

where $(x_N, y_N)$ is the position of the last point as given by the boundary conditions and (x(N), y(N)) is the position of the $N^{th}$ grating from the numerical process. The numerical process is then repeated until the difference between the calculated position and the position given in the boundary conditions for the $N^{th}$ grating is within a preselected criterion, such as the criterion of Eqs. (27):

$$|x(N)-x_N|<\sigma_{allowed}$$

$$|y(N)-y_N|<\sigma_{allowed} \qquad \text{Eqs. (27)}$$

The geometrical information for the bending deformation is obtained once the criteria of Eqs. (27) are met.

An exemplary method for obtaining geometrical information from cross-sectional deformation parameters is now discussed with respect to FIG. 15. FIG. 15 shows a radius of curvature $R_c$ related to cross-sectional deformations generically describes a deformation caused by all of the cross-sectional deformation modes. Eq. (28) correlates the corresponding strain data to the deformation parameter $R_c$:

$$R_c = \frac{1+\varepsilon_{(O,T,C)}}{1+2\varepsilon_{(O,T,C)}r/T}r \qquad \text{Eq. (28)}$$

where $\varepsilon_{(O,T,C)}$ denotes a summation of all the three strain components (ovalization, triangularization, rectangularization), r is the original (undeformed) radius of the tubular and T is the thickness of the wall of the tubular. As long as enough data points are available, one can determine the shape of a closed curve of fixed length that represents the contour of the cross-section from the radius of curvature in two-dimensional space. Typically, polar coordinates are used in this process. In a polar coordinate system, for any curve in 2D space, the radius of the curvature can be calculated as:

$$R_c = \frac{(1+u'_\theta)^{3/2}}{1+u'_\theta - u''_{\theta\theta}}r \qquad \text{Eq. (29)}$$

where $u'_\theta$ and $u''_{\theta\theta}$ are respectively the first and second derivative of the logarithm of r over the azimuth angle (u=ln r). Within a limited degree of deformation, $u'_\theta$ is much less than 1. Therefore, Eq. (29) can be further simplified to:

$$R_c = \frac{1+\frac{3}{2}u'_\theta}{1+u'_\theta - u''_{\theta\theta}}r \qquad \text{Eq. (30)}$$

which can be rewritten in the form of a normal differential equation as:

$$R_c u''_{\theta\theta} + (3/2 r - R_c)u'_\theta + (r-R_c) = 0 \qquad \text{Eq. (31)}$$

The boundary conditions for Eq. (31) are:

$$r(\theta=0)=r(\theta=2\pi)$$

$$r'_\theta(\theta=0)=r'_\theta(\theta=2\pi) \qquad \text{Eqs. (32)}$$

Using the Eqs. (31) and (32), a contour of a particular cross-section of the tubular can be created. The N gratings may be used to calculate position coordinates along the contour, with index i=1 to N. In one aspect, the position coordinates and derivates of the first grating is obtained. Given the position r(i) and the first derivative r'(i) of a point i in the cross-section, the first derivative $r'_\theta(i+1)$ of the adjacent point i+1 is calculated using Eq. (33):

$$r'_\theta(i+1) = r'_\theta(i) + \left[\left(1-\frac{3r(i)}{2R_c}\right)r'_\theta(i) + \left(1-\frac{r(i)}{R_c}\right)r_\theta(i)\right] * \frac{2\pi}{N} \qquad \text{Eq. (33)}$$

The position r(i+1) can then be calculated as $$r(i+1) = r(i) + r'_\theta(i+1) * \frac{2\pi}{N} \qquad \text{Eq. (34)}$$

Thus each point is used to calculate values for the next point along the circumference. For a given cross-section, the boundary values for the first point can be taken from the endpoint values obtained from the previously calculated cross-section. An educated estimate can be used as initial boundary values for the first cross-section. The values obtained for the $N^{th}$ point are checked against a suitable criterion such as the criterion of Eq. (35):

$$[r(N)_{previous}-r(N)_{current}]^2 + [r'_\theta(N)_{previous} - r'_\theta(N)_{current}]^2 < \sigma \qquad \text{Eq. (35)}$$

where σ is a present tolerance for the combined square error between two iterations. In a typical calculation, σ may be set to 0.0001.

Thus, calculations described using the Eqs. (17)-(35) yield geometrical information for the bending deformations and for cross-sectional deformations. The obtained geometrical information can then be used to obtain a three-dimensional image of the tubular using exemplary methods discussed below.

In one aspect, the exemplary method of creating a 3D image includes introducing an unstressed tubular having an axis, applying the geometrical information of the bending parameter to the axis to obtain a bent axis, applying the geometrical information of the cross-sectional deformations and adjusting the orientation of the cross-sections to correspond with the orientation bent axis. In one aspect, the three-dimensional image may be sent to a display and a stresses on the tubular shown. The various step of the exemplary method are discussed below in reference to FIGS. 16A-D.

FIG. 16A shows an exemplary original construction of an image of a tubular. The construct includes three contours 1602, 1604 and 1606 aligned along tubular axis 1608, which is oriented along a z-axis for the sake of illustration. The 3D surface image may be constructed using a suitable gridding technique and a set of initial geometrical data. In one embodiment, the cross-section contours are centered with the bent axis after the cross-section deformations have been applied to the contours of the cross-sections. FIG. 16B shows the tubular of FIG. 16A after a radial deformation is applied to each cross section. While bending the tubular axis, each cross-section contour is kept within the plane in which it resides before the bending. Due to the separation of deformation modes, the length of the circumference of the pipe remains unchanged during a cross-sectional deformation and only the shape of the cross-section contour is affected. The cross-section contours then are moved parallel to the xy-plane so that their centers correspond to the bent axis as shown in Eq. (36):

$$\begin{pmatrix} x' \\ y' \\ z' \end{pmatrix} = \begin{pmatrix} 1 & 0 & 0 \\ 0 & 1 & 0 \\ 0 & 0 & 1 \end{pmatrix} \begin{pmatrix} x \\ y \\ z \end{pmatrix} + \begin{pmatrix} \Delta x \\ \Delta y \\ \Delta z \end{pmatrix} \qquad \text{Eq. (36)}$$

wherein (x, y, z) and (x', y', z') are respectively the coordinates of a surface point in the cross-section before and after the bending and (Δx, Δy, Δz) is the motion caused by the bending of the cross point between the plane and the axis. FIG. 16C shows an exemplary tubular with bent axis and maintaining cross-section contours within the xy-plane.

Once the cross-section contours are centered on the bent axis, they are reoriented to reflect the bent axis using the exemplary methods discussed below. A tangent line to the bending axis is calculated, which is given in Eq. (37):

$$\vec{l} = (x_{i+1} - x_i)\vec{i} + (y_{i+1} - y_i)\vec{j} + (z_{i+1} - z_i)\vec{k} \quad (\text{Eq. 37})$$

wherein $(x_{i+1}, y_{i+1}, z_{i+1})$ and $(x_i, y_i, z_i)$ are coordinates of two closest neighboring points along the bending axis. In one embodiment, the cross-section contours are reoriented using a spherical coordinate system for spatial transformation. Eq. (37) can be rewritten in spherical coordinates as:

$$\vec{l} = r\cos\theta\cos\phi\cdot\vec{i} + r\cos\theta\sin\phi\cdot\vec{j} + \sin\phi\cdot\vec{k} \quad \text{Eq. (38)}$$

where $$r = \sqrt{(x_{i+1} - x_i)^2 + (y_{i+1} - y_i)^2 + (z_{i+1} - z_i)^2} \quad \text{Eq. (39)}$$

$$\cos\theta = \frac{(z_{i+1} - z_i)}{r}$$

$$\sin\theta = \frac{(x_{i+1} - x_i)}{r\cos\theta}$$

where θ is an azimuth angle around the y-axis and φ is an elevation angle. In a spherical coordinate system, to reorient the cross-section contours, one sets the original point in the cross between the axis and the cross-section, and the directions of the axis to be parallel to the current coordination system. The rotated coordinate system is achieved by rotating each cross-section contour by an azimuth angle (θ) around the y-axis and then rotating an elevation angle (φ) around the z-axis using:

$$\begin{pmatrix} x' \\ y' \\ z' \end{pmatrix} = \begin{pmatrix} \cos\phi & \sin\phi & 0 \\ -\sin\phi & \cos\phi & 0 \\ 0 & 0 & 1 \end{pmatrix} \begin{pmatrix} -\cos\theta\cos\phi & \cos\theta\sin\phi & \sin\theta \\ \sin\phi & \cos\phi & 0 \\ -\sin\theta\sin\phi & \sin\theta\sin\phi & -\cos\theta \end{pmatrix} \begin{pmatrix} x \\ y \\ z \end{pmatrix} \quad \text{Eq. (40)}$$

Figure 17:
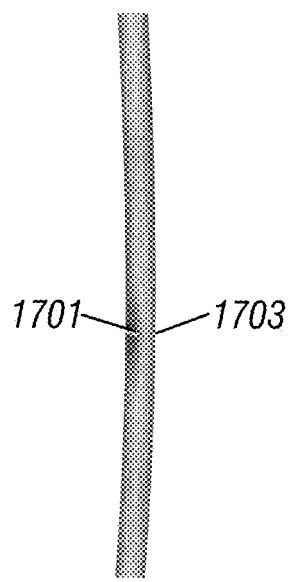
FIG. 17 shows an exemplary three-dimensional image of a tubular generated using the methods of the present disclosure.

FIG. 17 shows an exemplary three-dimensional image of a tubular generated using the exemplary methods discussed with respect to FIGS. 16A-D. A strain map is shown on the surface. Area 1701 indicates an area of an accumulation of negative strain and the area 1703 on the opposite side indicates an area of an accumulation of positive strain. The image of FIG. 17 presents visual information on where the deformation occurs and enables an operation to determine the severity of the deformation and a likelihood of tubular failure.

Thus, exemplary methods are described herein for, among others, determining various deformation modes from strain data, applying filters to separate strain components for selected deformation modes, determining geometrical information from the various deformation modes and producing a three-dimensional image of a tubular from the obtained strain data.

Figure 18A:
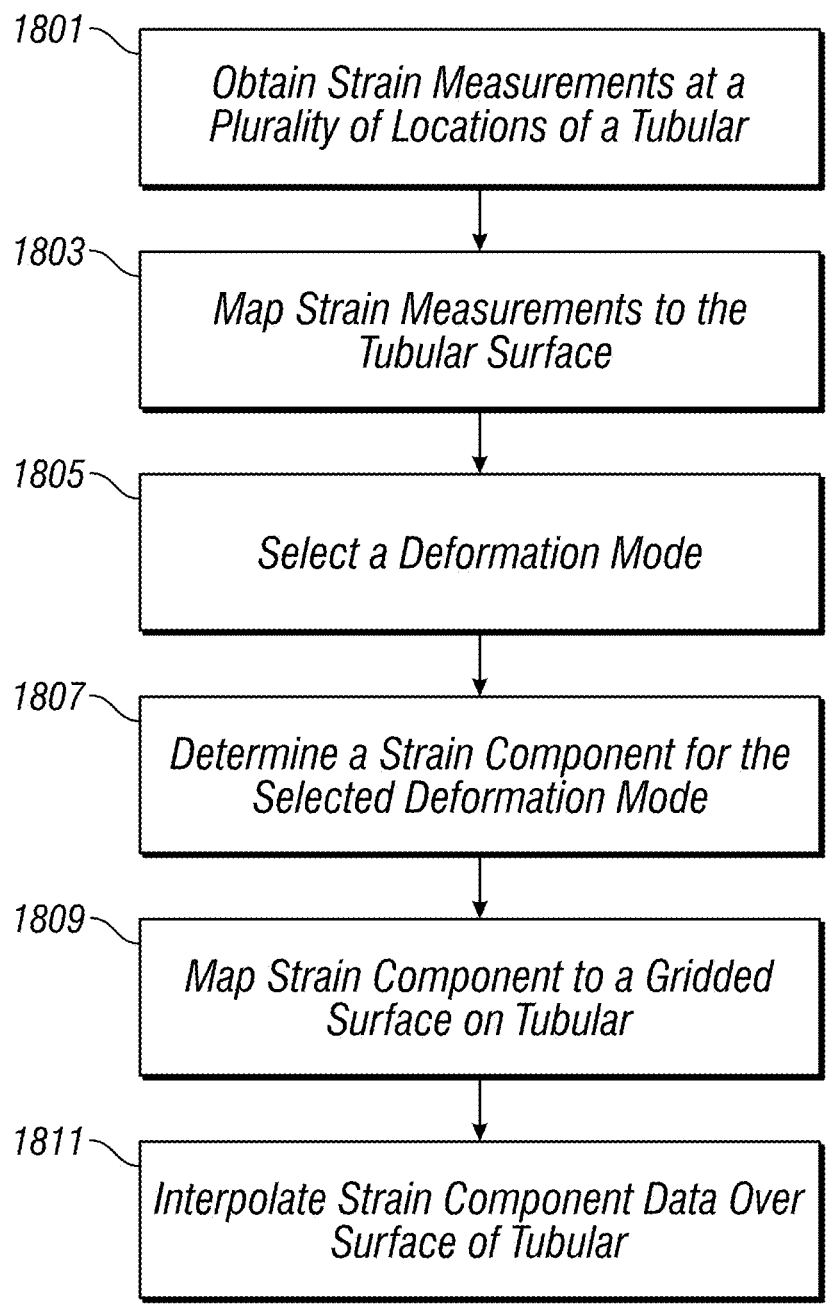
FIG. 18A shows a flowchart of an exemplary method for obtaining a map of strain at a tubular.

FIG. 18A shows a flowchart of an exemplary method for obtain a strain map over a tubular surface. In Box 1801, strain measurements are obtained at a plurality of locations at the tubular. In Box 1803, the strain measurements are mapped to a tubular surface. In Box 1805, a deformation mode is selected and in Box 1807, a strain component for the selected deformation mode is determined. In Box 1809, the obtained strain component data is mapped to a gridded surface on the tubular and in Box 1811, the strain component data is interpolated over the surface of the tubular.

Figure 18B:
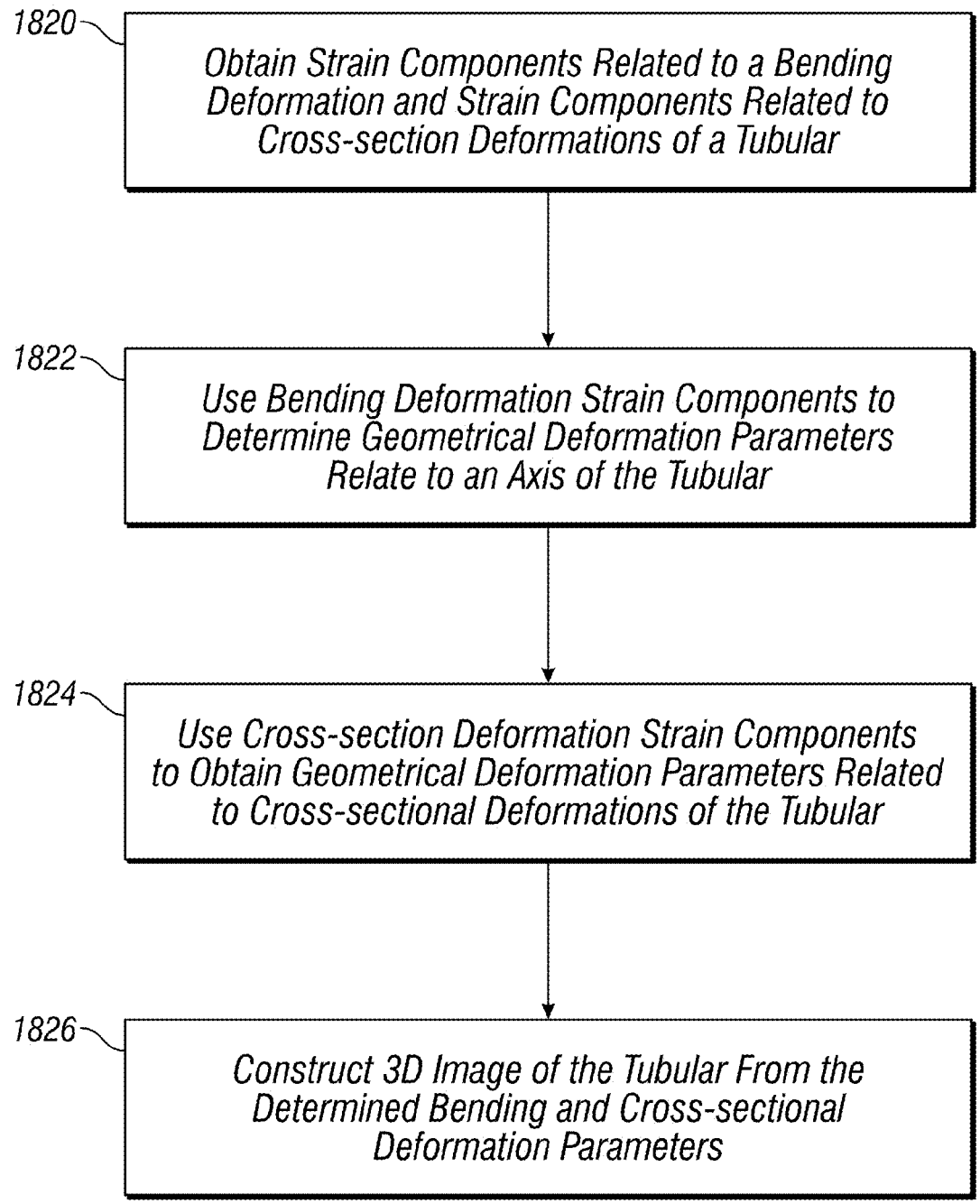
FIG. 18B shows a flowchart of the exemplary method for obtaining a three-dimensional image of a deformation of a tubular.

FIG. 18B shows a flowchart of exemplary methods for obtaining a three-dimensional image of a deformation of a tubular. In Box 1820, strain components for beding deformation and cross-section deformations related to a tubular are obtained using for example the method described in FIG. 18A. In Box 1822, the bending deformation strain components are used to obtain geometrical deformation related to deformation of an axis of the tubular. In Box 1324, cross-sectional deformation strain components are used to obtain geometrical deformation related to cross-sectional deformations of the tubular. In Box 1326, the obtained geometrical deformation parameters of bending and cross-sectional deformations are used to construct a three-dimensional image of the tubular.

The exemplary methods disclosed herein can be expanded to cover a broad range of tubular deformations. In one aspect, the exemplary methods allow real-time monitoring of tubular deformation information. In another aspect, the exemplary methods provide an increased accuracy of the data interpretation. The exemplary methods enhance sensitivity by depressing low frequency noises and removing high frequency noises.

Therefore, in one aspect, the present disclosure provides a method of determining a strain component for a deformation mode of a member, the method including: obtaining a plurality of measurements, each of the plurality of measurements related to a strain at a location of the member; selecting the deformation mode; and applying an adjustable filter to the plurality of strain measurements to determine the strain component for the selected deformation mode. The adjustable filter may be applied by obtaining a spectrum of the plurality of measurements in a frequency domain; and applying the adjustable filter to the spectrum. The adjustable filter may be one of a lowpass filter and a bandpass filter. The filter selects a frequency related to the selected deformation mode. A frequency response of the filter includes a cut-off frequency and a parameter defining frequency attenuation. The cut-off frequency is related to a wrap number of a plurality of sensors wrapped around the member to obtain the plurality of measurements and wherein the cutoff frequency $j_c(k)$ is given by $$j_c(k) = \frac{M}{N}(2k + 1),$$

where M is a total number of measurements, N is a total number of sensors in a single wrap of the member, and k is an index for selecting the deformation mode. The attenuation parameter may be selected to remove a phase noise. The frequency response may be convolved with the plurality of measurements. The member may typically include one of: (1) a casing; (2) a sand screen; (3) a subsea riser; (4) an umbilical; (5) a tubing; (6) a pipeline; (7) a cylindrical structure bearing a load. The selected deformation mode may include one of: (1) a compression/tensile mode; (2) a bending mode; (3) an ovalization mode; (4) a triangularization mode; (5) a rectangularization mode; and (6) a deformation mode having a spatial frequency that is an integer multiple of a spatial frequency of a bending deformation.

The plurality of measurements typically include one of: a measurement of wavelength shift; a measurement of frequency change; and a measurement of a change in impedance.

In another aspect, the present disclosure provides an apparatus for determining a strain component for a deformation mode of a member, the apparatus including a plurality of sensors, each sensor of the plurality of sensors configured to obtain a measurement of related to a strain at the member; and a processor configured to select a deformation mode and apply an adjustable filter to the plurality of strain measurements to determine the strain component for the selected deformation mode. The processor may be configured to obtain a representation of the plurality of measurements in a frequency domain and apply the adjustable filter to the representation. The adjustable filter may be one of a lowpass filter and a bandpass filter. The processor adjusts the filter to select a frequency related to the selected deformation mode. A frequency response of the filter includes a cut-off frequency and a parameter defining frequency attenuation. The cut-off frequency is related to a wrap number of a plurality of sensors wrapped around the member to obtain the plurality of measurement and wherein $$j_c(k) = \frac{M}{N}(2k+1)$$

where M is a total number of measurements, N is a total number of sensors in a single wrap of the member, and k is an index for selecting the deformation mode. The attenuation parameter may be selected to remove a phase noise. The frequency response is convolved with the plurality of measurements. In one aspect, the member is one of: (1) a casing; (2) a sand screen; (3) a subsea riser; (4) an umbilical; (5) a tubing; (6) a pipeline; (7) a cylindrical structure bearing a load. The selected deformation mode may be one of: (1) a compression/tensile mode; (2) a bending mode; (3) an ovalization mode; (4) a triangularization mode; (5) a rectangularization mode; and (6) a deformation mode having a spatial frequency that is an integer multiple of a spatial frequency of a bending deformation. The plurality of measurements may include one of: a measurement of wavelength shift; a measurement of frequency change; and a measurement of a change in impedance.

In yet another aspect, the present disclosure provides a computer-readable medium having stored thereon instructions that when read by a processor enable the processor to perform a method, the method comprising: obtaining strain measurements at a plurality of sensors, each of the plurality of measurements related to a strain at a location of the member; selecting the deformation mode; and applying an adjustable filter to the plurality of strain measurements to determine the strain component for the selected deformation mode.

While the foregoing disclosure is directed to the preferred embodiments of the disclosure, various modifications will be apparent to those skilled in the art. It is intended that all variations within the scope and spirit of the appended claims be embraced by the foregoing disclosure.

What is claimed is:

1. A method of determining a strain component for a selected deformation mode of a member, comprising:
   propagating a light through a fiber optic cable wrapped around the member, the fiber optic cable having a plurality of sensors therein;
   receiving light reflected at the plurality of sensors to determine a wavelength shift of the propagated light at each of the plurality of sensors, wherein each wavelength shift indicates a strain on the member at a location of a related sensor; and
   using a processor to:
   form a dataset that relates each wavelength shift for the plurality of sensors to locations of the plurality of sensors at the member,
   perform a transform on the dataset to obtain a spatial frequency spectrum, wherein a peak of the spatial frequency spectrum corresponds to the selected deformation mode of the member,
   apply an adjustable filter to the spatial frequency spectrum to select a peak of the spatial frequency spectrum that corresponds to the selected deformation mode, wherein a frequency response of the adjustable filter includes a parameter defining frequency attenuation and a cut-off frequency $i_c(k)$ given by:

$$j_c(k) = \frac{M}{N}(2k+1)$$

where M is a total number of strain measurements, N is a total number of sensors in a single wrap of the member, and k is an index for selecting the deformation mode, and
   perform an inverse transform on the selected peak to determine the strain components for the selected deformation mode.

2. The method of claim 1, wherein the adjustable filter is one of a lowpass filter and a bandpass filter.

3. The method of claim 1, wherein applying the adjustable filter selects a spatial frequency of the selected deformation mode.

4. The method of claim 1, wherein the attenuation parameter is selected to remove a phase noise.

5. The method of claim 1, wherein the frequency response is convolved with the plurality of measurements.

6. The method of claim 1, wherein the member is one of: (1) a casing; (2) a sand screen; (3) a subsea riser; (4) an umbilical; (5) a tubing; (6) a pipeline; (7) a cylindrical structure bearing a load.

7. The method of claim 1, wherein the selected deformation mode is one of: (1) a compression/tensile mode; (2) a bending mode; (3) an ovalization mode; (4) a triangularization mode; (5) a rectangularization mode; and (6) a deformation mode having a spatial frequency that is an integer multiple of a spatial frequency of a bending deformation.

8. The method of claim 1, wherein the plurality of measurements include at least one of: (1) a measurement of wavelength shift; (2) a measurement of frequency change; and (3) a measurement of a change in impedance.

9. An apparatus for determining a strain component for a selected deformation mode of a member, comprising:
   a fiber optic cable wrapped around the member and including a plurality of sensors;
   an interrogation unit configured to read the plurality of sensors and obtain a measurement from the plurality of sensors to determine a wavelength shift of light propagated in the fiber optic cable at each of the plurality of sensors, wherein each wavelength shift indicates a strain on the member at a location of a related sensor; and a processor configured to:
form a dataset that relates each wavelength shift for the plurality of sensors to locations of the plurality of sensors at the member,
obtain a spatial frequency spectrum, wherein a peak of the spatial frequency spectrum corresponds to the selected deformation mode of the member,
apply an adjustable filter to the spatial frequency spectrum to select a peak of the spatial frequency spectrum that corresponds to the selected deformation mode, wherein a frequency response of the filter includes a parameter defining frequency attenuation and a cut-off frequency given by:

$$j_c(k) = \frac{M}{N}(2k+1)$$

where M is a total number of measurements, N is a total number of sensors in a single wrap of the member, and k is an index for selecting the deformation mode, and
perform an inverse transform on the selected peak to determine the strain components for the selected deformation mode.

10. The apparatus of claim 9, wherein the adjustable filter is one of a lowpass filter and a bandpass filter.

11. The apparatus of claim 9, wherein the processor is configured to adjust the filter to select a spatial frequency related to the selected deformation mode.

12. The apparatus of claim 9, wherein the attenuation parameter is selected to remove a phase noise.

13. The apparatus of claim 9, wherein the frequency response is convolved with the plurality of measurements.

14. The apparatus of claim 9, wherein the member is one of: (1) a casing; (2) a sand screen; (3) a subsea riser; (4) an umbilical; (5) a tubing; (6) a pipeline; (7) a cylindrical structure bearing a load.

15. The apparatus of claim 9, wherein the selected deformation mode is one of: (1) a compression/tensile mode; (2) a bending mode; (3) an ovalization mode; (4) a triangularization mode; (5) a rectangularization mode; and (6) a deformation mode having a spatial frequency that is an integer multiple of a spatial frequency of a bending deformation.

16. The apparatus of claim 9, wherein the plurality of measurements include at least one of: (1) a measurement of wavelength shift; (2) a measurement of frequency change; and (3) a measurement of a change in impedance.

17. A non-transitory computer-readable medium having stored thereon instructions that when read by a processor enable the processor to perform a method, the method comprising:
propagating a light through a fiber optic cable wrapped around a member, the fiber optic cable having a plurality of sensors therein;
receiving light reflected at the plurality of sensors to determine a wavelength shift of the propagated light at each of the plurality of sensors, wherein each wavelength shift indicates a strain on the member at a location of a related sensor;
forming a dataset that relates each wavelength shift for the plurality of sensors to locations of the plurality of sensors at the member;
performing a transform on the dataset to obtain a spatial frequency spectrum, wherein a peak of the spatial frequency spectrum corresponds to the selected deformation mode of the member;
apply an adjustable filter to the spatial frequency spectrum to select a peak of the spatial frequency spectrum that corresponds to the selected deformation mode, wherein a frequency response of the filter includes a parameter defining frequency attenuation and a cut-off frequency given by:

$$j_c(k) = \frac{M}{N}(2k+1)$$

where M is a total number of measurements, N is a total number of sensors in a single wrap of the member, and k is an index for selecting the deformation mode, and
perform an inverse transform on the selected peak to determine the strain components of the selected deformation mode.

* * * * *